United States Patent [19]

Furgerson

[11] Patent Number: 4,831,524
[45] Date of Patent: May 16, 1989

[54] LOGIC DIAGRAM COMPILER/EXECUTOR

[75] Inventor: Donald F. Furgerson, Murrysville, Pa.

[73] Assignee: Westinghouse Electric Corp., Pittsburgh, Pa.

[21] Appl. No.: 878,097

[22] Filed: Jun. 24, 1986

[51] Int. Cl.[4] .............................................. G06F 15/60
[52] U.S. Cl. .................................... 364/300; 364/900; 364/947; 364/933.8; 364/488
[58] Field of Search ... 364/200 MS File, 900 MS File

[56] References Cited

U.S. PATENT DOCUMENTS

| | | | |
|---|---|---|---|
| 4,315,315 | 2/1982 | Kossiakoff | 364/300 |
| 4,455,619 | 6/1984 | Masui et al. | 364/900 |
| 4,527,249 | 7/1985 | Van Brunt | 364/578 |
| 4,546,435 | 10/1985 | Herbert et al. | 364/300 |
| 4,555,772 | 11/1985 | Stephens | 364/900 |
| 4,656,603 | 4/1987 | Dunn | 364/900 |

*Primary Examiner*—Gareth D. Shaw
*Assistant Examiner*—Kevin A. Kriess

[57] ABSTRACT

The present invention is an interactive method of creating and executing a logic diagram. The designer can pick and connect logic elements using a menu. The diagram can be edited and tested using a generic logic element. As the diagram is being created, an equations list is produced. The equations list is converted into an executable format by producing a compressed version of the equations list which is loaded into an execution table one record at a time. Each record can cause plural equations to be loaded and the equations are linked via token pointers. The unrelated equations are linked through input and output pointers. Each intermediate file record can cause record locations for associated input and output tokens to be preassigned. When executing, an input is percolated through the equations until an impasse is encountered. If a branch shape is encountered, a token pointer for a different branch is pushed onto a stack. When an impasse is encountered, the token pointer on the stack is used to continue percolation. Whenever no token pointers remain on the stack and an impasse occurs, another input is brought into the execution table and percolated. When all return stack pointers and inputs have been executed, the system checks for incomplete logic states, assumes a value and continues percolation. When all incomplete states have been resolved, the system stops and the outputs can be used for actual control.

27 Claims, 45 Drawing Sheets

Microfiche Appendix Included
(4 Microfiche, 197 Pages)

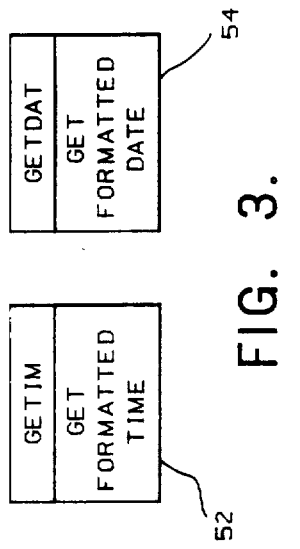
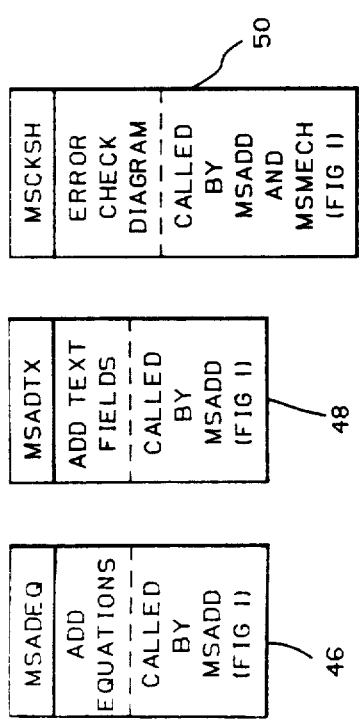
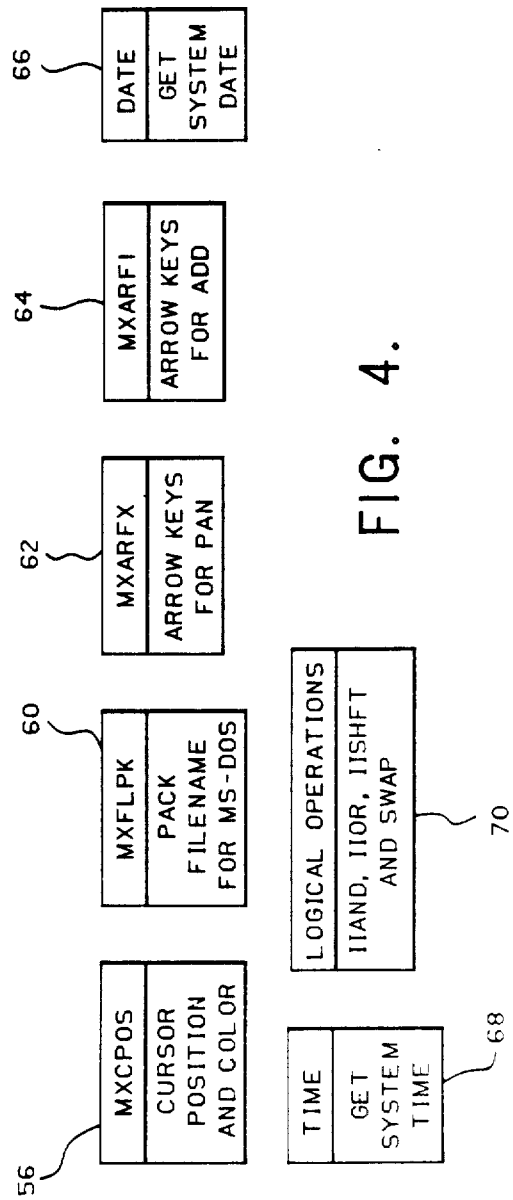

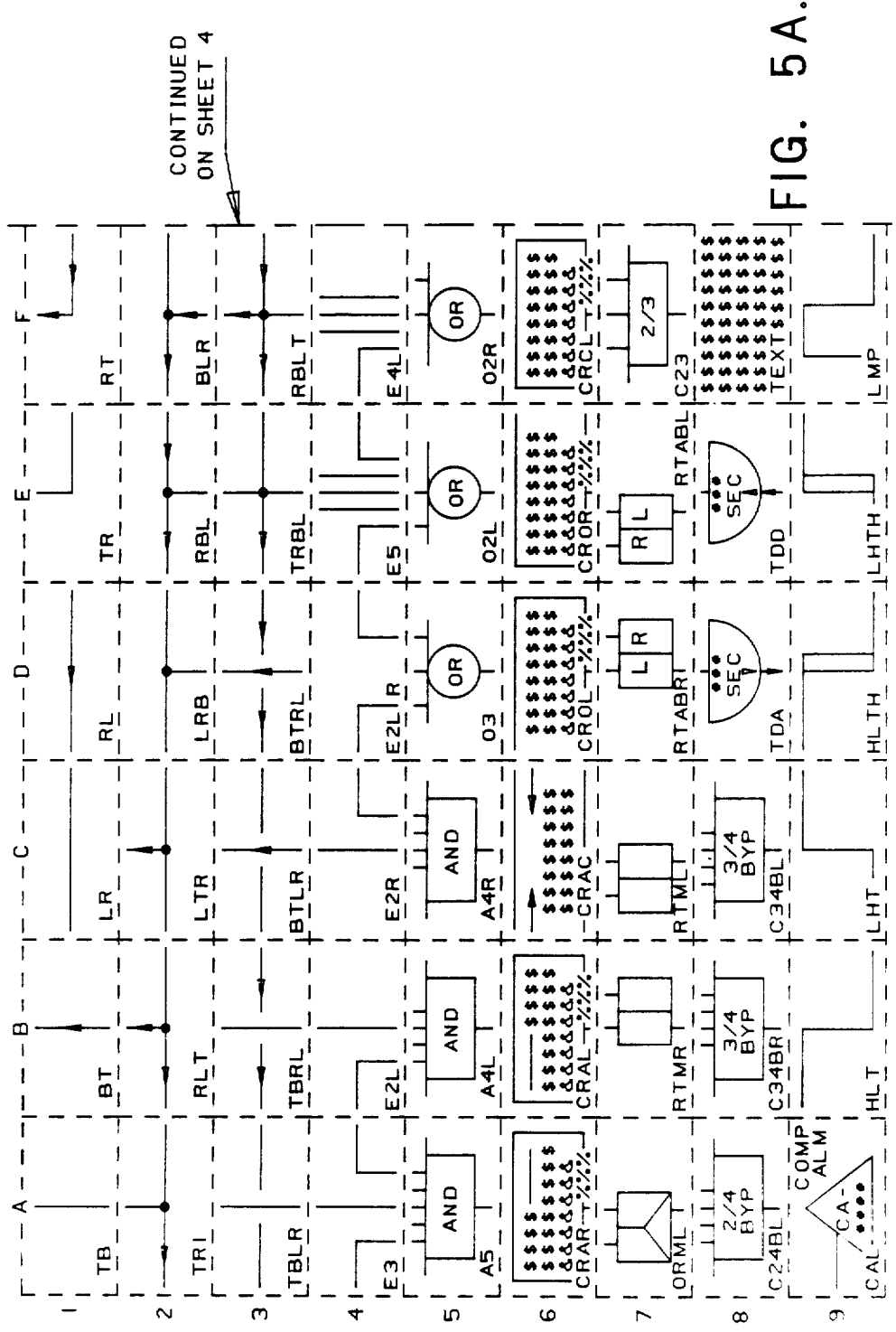

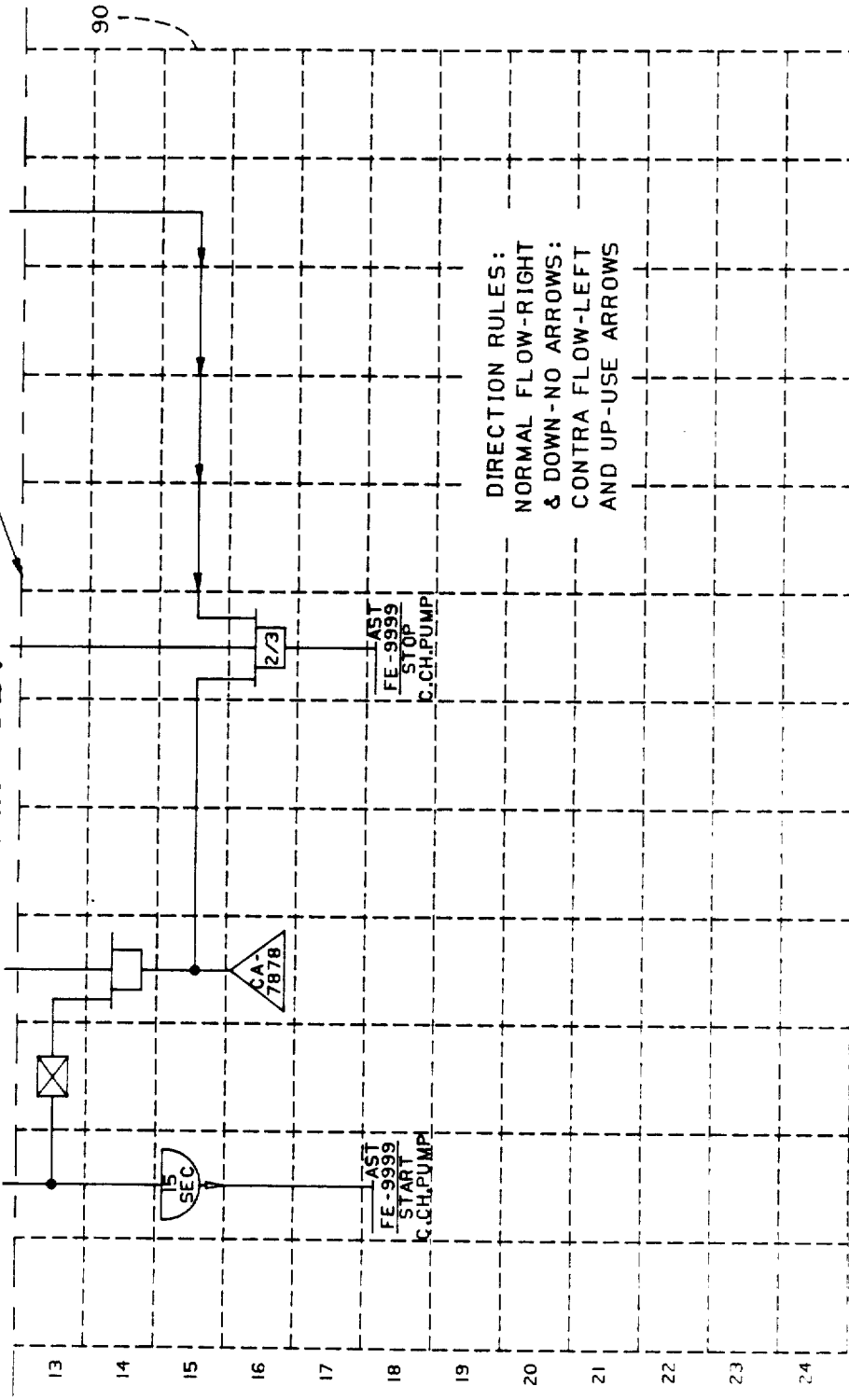

FIG. 11.

| EQUATION NUMBER | OUTPUT POSITION | TOKEN NUMBER | OPERATION | INPUT 1/ INPUT IDENTIFICATION TABLE POINTER | INPUT 2 | INPUT 3 | INPUT 4 | INPUT 5 |
|---|---|---|---|---|---|---|---|---|
| 1 | 1 | 1 | — | 1 | -1 | -1 | -1 | -1 |
| 2 | 1 | 3 | — | 2 | -1 | -1 | -1 | -1 |
| 3 | 1 | 5 | — | 3 | -1 | -1 | -1 | -1 |
| 4 | 1 | 6 | — | 4 | -1 | -1 | -1 | -1 |
| 5 | 1 | 7 | — | 5 | -1 | -1 | -1 | -1 |
| 6 | 1 | 9 | — | 6 | -1 | -1 | -1 | -1 |

| EQUATION NUMBER | OUTPUT POSITION | TOKEN NUMBER | OPERATION | INPUT 1 | INPUT 2 | INPUT 3 | INPUT 4 | INPUT 5 |
|---|---|---|---|---|---|---|---|---|
| 1 | 1 | 1 | 1 | 1 | — | — | — | — |
| 2 | 1 | 3 | 1 | 2 | — | — | — | — |
| 3 | 1 | 5 | 1 | 3 | — | — | — | — |
| 4 | 1 | 6 | 1 | 4 | — | — | — | — |
| 5 | 1 | 7 | 1 | 5 | — | — | — | — |
| 6 | 1 | 9 | 1 | 6 | — | — | — | — |
| 7 | 11 | 17 | 9 | 1 | — | — | — | 9 |
| 8 | 7 | 18 | 3 | 1 | — | — | — | 11 |
| 9 | 4 | 18 | 3 | 7 | — | — | — | 13 |
| 10 | 1 | 19 | 3 | 1 | — | — | — | — |
| 11 | 1 | 19 | 3 | 1 | — | — | — | — |
| 12 | 5 | 29 | 3 | 6 | — | — | — | — |
| 13 | 6 | 29 | 3 | 1 | — | — | — | — |
| 14 | 1 | 30 | 3 | 4 | — | — | — | — |
| 15 | 1 | 31 | 4 | 1 | 5 | — | — | — |
| 16 | 1 | 41 | 4 | — | — | — | — | — |

FIG. 17.

| EQUATION NUMBER | OUTPUT POSITION | OPERATION | TOKEN | INPUT 1 | INPUT 2 | INPUT 3 | INPUT 4 | INPUT 5 |
|---|---|---|---|---|---|---|---|---|
| 1 |  |  | 2 |  |  |  |  |  |
| 2 |  |  | 4 | 2 |  |  |  |  |
| 3 |  |  | 7 | 3 |  |  |  |  |
| 4 | 7 | 3 | 14 |  |  |  |  |  |
| 5 | 7 | 3 | 16 |  |  |  |  |  |
| 6 |  | 3 | 16 |  |  |  |  | 6 |
| 7 | 7 | 3 | 17 | 7 |  |  |  |  |
| 8 |  | 3 | 18 | 7 |  |  |  |  |
| 9 | 7 | 3 | 19 |  |  |  |  |  |
| 10 | 4 | 3 | 26 |  |  |  |  | 11 |
| 11 |  | 3 | 26 | 7 |  |  |  |  |
| 12 |  | 3 | 27 | 7 |  |  |  |  |
| 13 |  | 3 | 28 |  |  |  |  | 14 |
| 14 |  | 3 | 28 |  |  |  |  |  |
| 15 |  | 3 | 30 |  |  |  |  |  |
| 16 |  | 3 | 31 |  |  |  |  | 18 |
| 17 | 5 | 3 | 38 | 6 |  |  |  |  |
| 18 | 6 | 3 | 38 | 8 |  |  |  |  |
| 19 | 1 | 3 | 39 | 4 |  |  |  |  |
| 20 | 7 | 4 | 40 | 8 |  |  |  |  |
| 21 | 3 | 3 | 41 | 7 |  |  |  |  |
| 22 | 1 | 3 | 42 |  |  |  |  | 23 |
| 23 | 5 | 3 | 42 | 6 |  |  |  | 24 |
| 24 | 6 | 5 | 42 |  | 5 |  |  |  |
| 25 | 1 | 3 | 42 | 6 |  |  |  |  |
| 26 | 8 | 3 | 43 |  |  |  |  |  |
| 27 | 7 | 3 | 50 | 7 |  |  |  |  |
| 28 |  | 3 | 51 |  |  |  |  | 29 |
| 29 | 6 | 3 | 52 |  |  |  |  | 30 |
| 30 | 8 | 3 | 52 |  |  |  |  |  |
| 31 | 1 | 5 | 52 |  | 4 | 5 |  |  |
| 32 |  | 3 | 53 |  |  |  |  |  |
| 33 | 3 | 2 | 54 |  |  |  |  |  |
| 34 | 2 | 2 | 62 |  |  |  |  |  |
| 35 | 1 | 2 | 64 |  |  |  |  |  |
|  |  |  | 66 |  |  |  |  |  |

| RECORD # | TOKEN # | SHAPE # | EQUATION POINTER | TEXT POINTER | OUTPUT POINTER | OPERATION CODE EXIT | COMPONENT ID EXIT/ENTRY CODE 1 |
|---|---|---|---|---|---|---|---|
| 1 | 2 | 59 | 1 | 1 | 2 | 1 | TEST1 |
| 2 | 4 | 59 | 2 | 3 | 3 | – | TEST2 |
| 3 | 7 | 59 | 3 | 5 | 0 | – | TEST3 |
| 4 | 14 | – | 4 | 0 | 0 | 3 | 7 |
| 5 | 16 | 22 | 5 | 0 | 0 | 3 | 7 |
| 6 | 17 | 34 | 7 | 0 | 0 | 9 | – |
| 7 | 18 | 9 | 8 | 0 | 0 | 3 | – |
| 8 | 19 | – | 9 | 0 | 0 | 3 | 7 |
| 9 | 26 | 22 | 10 | 0 | 0 | 9 | 7 |
| 10 | 27 | 34 | 12 | 0 | 0 | 3 | 4 |
| 11 | 28 | 38 | 13 | 0 | 0 | 3 | – |
| 12 | 30 | – | 15 | 0 | 0 | 3 | – |
| 13 | 31 | – | 16 | 0 | 0 | 4 | – |
| 14 | 38 | 39 | 17 | 0 | 0 | 3 | – |
| 15 | 39 | 10 | 19 | 0 | 0 | 3 | 6 |
| 16 | 40 | 46 | 20 | 0 | 1 | 3 | 4 |
| 17 | 41 | 11 | 21 | 0 | 0 | 4 | 7 |
| 18 | 42 | 37 | 22 | 0 | 0 | 3 | 3 |
| 19 | 43 | 8 | 25 | 0 | 0 | 5 | 6 |
| 20 | 50 | 54 | 26 | 0 | 1 | 3 | – |
| 21 | 51 | 6 | 27 | 0 | 0 | 3 | 8 |
| 22 | 52 | 29 | 28 | 0 | 0 | 3 | 7 |
| 23 | 53 | 7 | 31 | 0 | 0 | 5 | 8 |
| 24 | 54 | 52 | 32 | 0 | 3 | 2 | OUT1 |
| 25 | 62 | 60 | 33 | 7 | 2 | 2 | OUT2 |
| 26 | 64 | 60 | 34 | 9 | 1 | 2 | OUT3 |
| 27 | 66 | 60 | 35 | 11 | | | |

FIG. 18B.

| | SIGNAL TAG | TEXT FIELD 1 | TEXT FIELD 2 | | TEXT FIELD 3 | | TEXT FIELD 4 | | TEXT FIELD 5 | |
|---|---|---|---|---|---|---|---|---|---|---|
| | EXIT/ENTRY CODE 2 | EXIT/ENTRY CODE 3 | EXIT/ENTRY CODE 4 | EXIT/ENTRY CODE 5 | EXIT/ENTRY CODE 6 | EXIT/ENTRY CODE 7 | EXIT/ENTRY CODE 8 | EXIT/ENTRY CODE 9 | EXIT/ENTRY CODE 10 | |
| 1 | INP | - | - | - | - | - | - | - | - | |
| 2 | INP | - | - | - | - | - | - | - | - | |
| 3 | INP | - | - | - | - | - | - | - | - | |
| 4 | - | - | - | - | - | - | - | - | - | |
| 5 | 7 | - | - | - | - | - | - | - | - | |
| 6 | 7 | - | - | - | - | - | - | - | - | |
| 7 | - | - | - | - | - | - | - | - | - | |
| 8 | 7 | - | - | - | - | - | - | - | - | |
| 9 | 7 | - | 6 | - | - | - | - | - | - | |
| 10 | - | - | - | - | - | - | - | - | - | |
| 11 | 8 | - | - | - | - | - | - | - | - | |
| 12 | - | 5 | - | - | - | - | - | - | - | |
| 13 | 8 | - | - | - | - | - | - | - | - | |
| 14 | 8 | - | - | - | - | - | - | - | - | |
| 15 | 7 | - | - | - | - | - | - | - | - | |
| 16 | - | - | - | 5 | - | - | - | - | - | |
| 17 | 5 | - | - | - | - | - | - | - | - | |
| 18 | 6 | - | - | 6 | - | - | - | - | - | |
| 19 | - | - | - | - | - | - | - | - | - | |
| 20 | 7 | - | - | - | - | - | - | - | - | |
| 21 | 4 | 5 | - | - | - | - | - | - | - | |
| 22 | OUT | - | - | - | - | - | - | - | - | |
| 23 | OUT | - | - | - | - | - | - | - | - | |
| 24 | OUT | - | - | - | - | - | - | - | - | |

CONTINUED FROM FIGURE 18A

FIG. 22.

Token table (544):

| | T1 | T2 | T3 | T4 | T5 |
|---|---|---|---|---|---|
| | 2 | 1 | 0 | 0 | 0 |
| | ooo | | | | |
| | 14 | 2 | | | |

Execution table (524):

| E1 | E2 | E3 | E4 | E5 | E6 | E7 | E8 | E9 |
|---|---|---|---|---|---|---|---|---|
| 1 | 2 | 59 | 1 | 1 | 2 | 0 | | |
| 2 | 14 | | | | | | | |

Inputs table (558):

| I1 | I2 | I3 | I4 |
|---|---|---|---|
| 1 | TEST 1 | INP | 1 |

Maximum inputs table (550):

| M1 | M2 |
|---|---|
| | |

Outputs table (560):

| O1 | O2 | O3 | O4 |
|---|---|---|---|
| | | | |

Return stack table (582):

| R1 | R2 |
|---|---|
| | |

FIG. 24.

TOKEN TABLE

| T1 | T2 | T3 | T4 | T5 |
|----|----|----|----|----|
| 2  | 1  | 0  | 0  | 0  |
| 4  | 3  | 0  | 0  | 0  |
| 7  | 5  | 0  | 0  | 0  |
| 14 | 2  | 0  | 0  | 0  |
| 16 | 4  | 2  | 0  | 0  |
| 17 | 10 |    |    |    |
| 19 | 6  |    |    |    |
| 26 | 7  |    |    |    |
| 28 | 8  |    |    |    |

544

RETURN STACK TABLE

| R1 | R2 |
|----|----|
|    |    |
|    |    |

582

OUTPUTS TABLE

| O1 | O2 | O3 | O4 |
|----|----|----|----|
|    |    |    |    |

560

INPUTS TABLE

| I1 | I2     | I3  | I4 |
|----|--------|-----|----|
| 1  | TEST 1 | INP | 1  |
| 2  | TEST 2 | INP | 3  |
| 3  | TEST 3 | INP | 5  |

558

EXECUTION TABLE

| E1 | E2 | E3 | E4 | E5 | E6 | E7 | E8 | E9 |
|----|----|----|----|----|----|----|----|----|
| 1  | 2  | 59 | 1  | 1  | 2  | 0  | 0  | 0  |
| 2  | 14 | 1  | 3  | 1  | 7  | 0  | 0  | 0  |
| 3  | 4  | 59 | 1  | 2  | 4  | 0  | 0  | 0  |
| 4  | 16 | 22 | 3  | 3  | 8  | 9  | 0  | 0  |
| 5  | 7  | 59 | 1  | 3  | 6  | 0  | 0  | 0  |
| 6  | 19 |    |    | 5  |    |    |    |    |
| 7  | 26 |    |    | 2  |    |    |    |    |
| 8  | 28 |    | 3  | 4  | 10 | 0  | 0  | 0  |
| 9  | 16 | 22 |    | 3  |    |    |    |    |
| 10 | 17 |    |    | 9  |    |    |    |    |

524

MAXIMUM INPUTS TABLE

| M1 | M2 |
|----|----|
| 14 | 1  |
| 22 | 2  |

550

TOKEN TABLE (544)

| T1 | T2 | T3 | T4 | T5 |
|----|----|----|----|----|
| 38 | 16 | 2  | 0  | 0  |
| 39 | 23 |    |    |    |
| 40 | 18 |    |    |    |
|    |    |    |    |    |
| 42 | 19 |    |    |    |
| 43 | 20 |    |    |    |
| 50 | 22 |    |    |    |

RETURN STACK TABLE (582)

| R1 | R2 |
|----|----|
|    |    |

OUTPUTS TABLE (560)

| O1 | O2 | O3 | O4 |
|----|----|----|----|
|    |    |    |    |

INPUTS TABLE (558)

| I1 | I2 | I3 | I4 |
|----|----|----|----|
| 4  |    |    |    |

EXECUTION TABLE (524)

| E1 | E2 | E3 | E4 | E5 | E6 | E7 | E8 | E9 |
|----|----|----|----|----|----|----|----|----|
| 16 | 38 | 39 | 3  | 15 | 22 | 21 | 0  | 0  |
| 17 | 28 | 38 | 3  | 14 |    | 0  | 0  | 0  |
| 18 | 40 |    |    | 8  | 18 |    |    |    |
| 19 | 42 |    |    | 12 |    |    |    |    |
| 20 | 43 |    | 3  | 13 | 22 | 0  | 0  | 0  |
| 21 | 38 | 39 |    | 23 |    |    |    |    |
| 22 | 50 |    |    | 16 | 21 |    |    |    |
| 23 | 39 |    |    |    |    |    |    |    |

MAXIMUM INPUTS TABLE (550)

| M1 | M2 |
|----|----|
| 38 | 2  |

TOKEN TABLE 544

| T1 | T2 | T3 | T4 | T5 |
|---|---|---|---|---|
| 38 | 16 | 2 | 0 | 0 |
| 39 | 23 | 0 | 0 | 0 |
| 40 | 18 | 2 | 0 | 0 |
| 41 | 26 | 0 | 0 | 0 |
| 42 | 19 | | | |
| 43 | 20 | | | |
| 50 | 22 | | | |
| 51 | 24 | | | |
| 52 | 25 | | | |
| 53 | 28 | | | |

RETURN STACK TABLE 582

| R1 | R2 |
|---|---|
| | |
| | |

INPUTS TABLE 558

| I1 | I2 | I3 | I4 |
|---|---|---|---|
| 4 | | | |

MAXIMUM INPUTS TABLE 550

| M1 | M2 |
|---|---|
| 42 | 3 |
| | |

EXECUTION TABLE 524

| E1 | E2 | E3 | E4 | E5 | E6 | E7 | E8 | E9 |
|---|---|---|---|---|---|---|---|---|
| 16 | 38 | 39 | 3 | 15 | 22 | 0 | 0 | 0 |
| 17 | 28 | 38 | 3 | 14 | 18 | 0 | 0 | 0 |
| 18 | 40 | 46 | 4 | 8 | 25 | 0 | 0 | 0 |
| 19 | 42 | | | 12 | | 27 | | |
| 20 | 43 | 39 | 3 | 13 | 22 | 0 | 0 | 0 |
| 21 | 38 | 10 | 3 | 23 | 21 | 0 | 0 | 0 |
| 22 | 50 | | | 16 | 23 | | | |
| 23 | 39 | | | 24 | | | | |
| 24 | 51 | 11 | 3 | 18 | 27 | 0 | 0 | 0 |
| 25 | 52 | | | 28 | | — | | |
| 26 | 41 | | | 26 | 26 | | | |
| 27 | 42 | | | | | | | |
| 28 | 53 | | | | | | | |

OUTPUTS TABLE 560

| O1 | O2 | O3 | O4 |
|---|---|---|---|
| | | | |
| | | | |

FIG. 29.

TOKEN TABLE (544)

| T1 | T2 | T3 | T4 | T5 |
|----|----|----|----|----|
| 42 | 19 | 3  | 0  | 0  |
| 43 | 20 |    |    |    |
| 50 | 22 |    |    |    |
| 51 | 24 |    |    |    |
| 52 | 25 |    |    |    |
| 53 | 28 |    |    |    |
| 54 | 29 |    |    |    |

RETURN STACK TABLE (582)

| R1 | R2 |
|----|----|
|    |    |

INPUTS TABLE (558)

| I1 | I2 | I3 | I4 |
|----|----|----|----|
| 4  |    |    | 14 |

MAXIMUM INPUTS TABLE (550)

| M1 | M2 |
|----|----|
| 37 | 3  |

OUTPUTS TABLE (560)

| O1 | O2 | O3 | O4 |
|----|----|----|----|
|    |    |    | 04 |

EXECUTION TABLE (524)

| E1 | E2 | E3 | E4 | E5 | E6 | E7 | E8 | E9 |
|----|----|----|----|----|----|----|----|----|
| 19 | 42 | 37 | 3  | 12 | 29 | 27 | 0  | 0  |
| 20 | 43 | 39 | 3  | 13 | 22 | 0  | 0  | 0  |
| 21 | 38 | 10 | 3  | 23 | 21 | 0  | 0  | 0  |
| 22 | 50 |    |    | 16 | 23 |    |    |    |
| 23 | 39 | 11 | 3  | 24 | 27 | 0  | 0  | 0  |
| 24 | 51 | 37 | 3  | 18 | 29 | 30 | 0  | 0  |
| 25 | 52 |    |    | 28 | 26 | 0  | 0  | 0  |
| 26 | 41 |    |    | 26 |    |    |    |    |
| 27 | 42 |    |    | 27 | 29 | 0  | 0  | 0  |
| 28 | 53 |    |    |    |    |    |    |    |
| 29 | 54 |    |    | 20 |    |    |    |    |
| 30 | 42 | 37 | 3  |    |    |    |    |    |

FIG. 30.

TOKEN TABLE 544

| T1 | T2 | T3 | T4 | T5 |
|----|----|----|----|----|
| 51 | 24 |    |    |    |
| 52 | 25 | 0  | 0  | 0  |
| 53 | 28 | 3  | 0  | 0  |
| 54 | 29 |    |    |    |
| 62 | 31 |    |    |    |
| 64 | 33 |    |    |    |

RETURN STACK TABLE 582

| R1 | R2 |
|----|----|
|    |    |

INPUTS TABLE 558

| I1 | I2 | I3 | I4 |
|----|----|----|----|
| 4  |    |    | 14 |

MAXIMUM INPUTS TABLE 550

| M1 | M2 |   |
|----|----|---|
| 29 | 3  |   |

EXECUTION TABLE 524

| E1 | E2 | E3 | E4 | E5 | E6 | E7 | E8 | E9 |
|----|----|----|----|----|----|----|----|----|
| 24 | 51 | 6  | 3  | 25 | 23 | 0  | 0  | 0  |
| 25 | 52 | 29 | 3  | 18 | 24 | 32 | 0  | 0  |
| 26 | 41 | 11 | 3  | 28 | 27 | 0  | 0  | 0  |
| 27 | 42 | 37 | 3  | 26 | 29 | 30 | 0  | 0  |
| 28 | 53 |    |    | 34 | 26 |    |    |    |
| 29 | 54 | 37 | 3  | 27 | 29 | 0  | 0  | 0  |
| 30 | 42 | 29 | 3  | 20 |    |    |    |    |
| 31 | 62 |    |    | 22 | 33 | 34 | 0  | 0  |
| 32 | 52 |    |    | 18 |    |    |    |    |
| 33 | 64 |    |    | 32 |    |    |    |    |
| 34 | 52 | 29 | 3  | 18 | 28 | 0  | 0  | 0  |

OUTPUTS TABLE 560

| O1 | O2 | O3 | O4 |
|----|----|----|----|
|    |    |    | 04 |

FIG. 31A.

| EXECUTION TABLE 524 | | | | | | | | | | TOKEN TABLE 544 | | | | | | MAX INPUTS TABLE 550 | | INPUTS TABLE 558 | | | | OUTPUTS TABLE 560 | | | | RETURN STACK TABLE 582 | |
|---|---|---|---|---|---|---|---|---|---|---|---|---|---|---|---|---|---|---|---|---|---|---|---|---|---|---|---|
| E1 | E2 | E3 | E4 | E5 | E6 | E7 | E8 | E9 | T1 | T2 | T3 | T4 | T5 | M1 | M2 | I1 | I2 | I3 | I4 | O1 | O2 | O3 | O4 | R1 | R2 |
| 1 | 2 | 59 | 1 | 1 | 2 | 0 | 0 | 0 | 1 | 0 | 0 | 0 | 0 | 1 | 0 | 1 | TEST_1 | INP_1 | 1 | 1 | OUT_1 | OUT_31 | 1 | 0 |
| 2 | 14 | — | 3 | 1 | 7 | 0 | 0 | 0 | 2 | 1 | 0 | 0 | 0 | " | " | 2 | " | " | " | 2 | OUT_2 | " | OUT_33 | 2 | 0 |
| 3 | 4 | 59 | 1 | 2 | 4 | 0 | 0 | 0 | 3 | 0 | 0 | 0 | 0 | 14 | 1 | 2 | TEST_2 | INP_2 | 3 | 2 | OUT_2 | " | " | 2 | 0 |
| 4 | 16 | 22 | 3 | 3 | 8 | 9 | 0 | 0 | 4 | 3 | 0 | 0 | 0 | " | " | 3 | TEST_3 | INP_3 | 5 | 3 | OUT_3 | OUT_35 | 3 | 0 |
| 5 | 7 | 59 | 1 | 3 | 6 | 0 | 0 | 0 | 5 | 0 | 0 | 0 | 0 | 22 | 2 | 4 | " | " | 0 | 4 | " | " | 0 | 4 | 0 |
| 6 | 19 | — | 3 | 5 | 13 | 0 | 0 | 0 | 6 | 0 | 0 | 0 | 0 | " | " | 5 | " | " | 0 | 5 | " | " | 0 | 5 | 0 |
| 7 | 26 | 22 | 3 | 2 | 14 | 15 | 0 | 0 | 7 | 5 | 0 | 0 | 0 | 29 | 3 | 6 | " | " | 0 | 6 | " | " | 0 | 6 | 0 |
| 8 | 28 | 38 | 3 | 4 | 18 | 17 | 0 | 0 | " | " | " | " | " | " | " | 7 | " | " | 0 | 7 | " | " | 0 | 7 | 0 |
| 9 | 16 | 22 | 3 | 3 | 10 | 0 | 0 | 0 | 14 | 2 | 0 | 0 | 0 | 37 | 0 | 8 | " | " | 0 | 8 | " | " | 0 | 8 | 0 |
| 10 | 17 | 34 | 9 | 9 | 11 | 0 | 0 | 0 | 15 | 0 | 0 | 0 | 0 | 38 | 0 | 9 | " | " | 0 | 9 | " | " | 0 | 9 | 0 |
| 11 | 18 | 9 | 3 | 10 | 12 | 0 | 0 | 0 | 16 | 4 | 2 | 0 | 0 | 39 | 0 | 10 | " | " | 0 | 10 | " | " | 0 | 10 | 0 |
| 12 | 30 | — | 3 | 11 | 19 | 0 | 0 | 0 | 17 | 10 | 0 | 0 | 0 | 40 | 0 | 11 | " | " | 0 | 11 | " | " | 0 | 11 | 0 |
| 13 | 31 | — | 3 | 6 | 20 | 0 | 0 | 0 | 18 | 11 | 0 | 0 | 0 | 41 | 0 | 12 | " | " | 0 | 12 | " | " | 0 | 12 | 0 |
| 14 | 27 | 34 | 9 | 7 | 17 | 0 | 0 | 0 | 19 | 6 | 0 | 0 | 0 | 42 | 3 | 13 | " | " | 0 | 13 | " | " | 0 | 13 | 0 |
|   |   |   |   |   |   |   |   |   |   |   |   |   |   |   |   | 14 | " | " | 0 | 14 | " | " | 0 | 14 | 0 |

| | | | | | | | | | | | | |
|---|---|---|---|---|---|---|---|---|---|---|---|---|
| | 0 | 0 | 0 | 0 | 0 | | 0 | 0 | 0 | 0 | 0 | 0 |
| | 0 | 0 | 0 | 0 | 0 | | 0 | 0 | 0 | 0 | 0 | 0 |
| | 2 | 0 | 3 | 0 | 3 | | 0 | 0 | 0 | 0 | 0 | 0 |
| | 22 | 24 | 25 | 28 | 29 | | 31 | 0 | 33 | 0 | 35 | 0 |
| | 50 | 51 | 52 | 53 | 54 | | 62 | 63 | 64 | 65 | 66 | 288 |
| 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 |
| 0 | 0 | 0 | 34 | 0 | 0 | 0 | 0 | 0 | 0 | 0 | 0 | 0 |
| 35 | 29 | 1 | 33 | 2 | 28 | 3 | 0 | 0 | 0 | 0 | 0 | 0 |
| 27 | 20 | 22 | 18 | 32 | 18 | 29 | 0 | 0 | 0 | 0 | 0 | 0 |
| 5 | 3 | 2 | 3 | 2 | 3 | 2 | 0 | 0 | 0 | 0 | 0 | 0 |
| 52 | 37 | 60 | 29 | 60 | 29 | 60 | 0 | 0 | 0 | 0 | 0 | 0 |
| 54 | 42 | 62 | 52 | 64 | 52 | 66 | 0 | 0 | 0 | 0 | 0 | 0 |
| 29 | 30 | 31 | 32 | 33 | 34 | 35 | 36 | 37 | 38 | 39 | 40 | 500 |

CONTINUED FROM FIG. 31B

FIG. 33.

| EXE SEQ | EXECUTION TABLE ||||||||| TOKEN TABLE ||||| MAX INPUTS TABLE || INPUTS TABLE |||| OUTPUTS TABLE |||| RETURN STACK TABLE ||
|---|---|---|---|---|---|---|---|---|---|---|---|---|---|---|---|---|---|---|---|---|---|---|---|---|
| | E1 | E2 | E3 | E4 | E5 | E6 | E7 | E8 | E9 | T1 | T2 | T3 | T4 | T5 | M1 | M2 | I1 | I2 | I3 | I4 | O1 | O2 | O3 | O4 | R1 | R2 |
| 1 | 1 | 2 | 59 | 1 | 1 | 2 | 0 | 2 | T | 0 | 0 | 0 | 0 | 0 | 0 | 0 | 1 | TEST | INP | 1 | 0 | 0 | 0 | 0 | 1 | 15 |
| 2 | 2 | 14 | 1 | 3 | 1 | 7 | 0 | 0 | T | 26 | 7 | 2 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | | | | | | | | | | | | |
| 3 | 7 | 26 | 22 | 3 | 2 | 14 | 15 | 1 | T | 40 | 18 | 2 | 0 | 0 | | | | | | | | | | | | |
| 0 | 0 | 0 | 0 | 0 | 0 | 0 | 0 | 0 | 0 | 0 | 0 | 0 | 0 | 0 | | | | | | | | | | | | |
| 4 | 14 | 27 | 34 | 9 | 7 | 17 | 0 | 1 | F | 0 | 0 | 0 | 0 | 0 | | | | | | | | | | | | |
| 0 | 0 | 0 | 0 | 0 | 0 | 0 | 0 | 0 | 0 | 0 | 0 | 0 | 0 | 0 | | | | | | | | | | | | |
| 5 | 17 | 28 | 38 | 3 | 14 | 18 | 0 | 1 | F | | | | | | | | | | | | | | | | | |
| 6 | 18 | 40 | 46 | 4 | 8 | 25 | 0 | 1 | IC | | | | | | | | | | | | | | | | | |

524 — 544 — 550 — 558 — 560 — 582

| EXE SEQ | EXECUTION TABLE | | | | | | | | | TOKEN TABLE | | | | | MAX INPUTS TABLE | | INPUTS TABLE | | | | OUTPUTS TABLE | | | | RETURN STACK TABLE | |
|---|---|---|---|---|---|---|---|---|---|---|---|---|---|---|---|---|---|---|---|---|---|---|---|---|---|---|
| | E1 | E2 | E3 | E4 | E5 | E6 | E7 | E8 | E9 | T1 | T2 | T3 | T4 | T5 | M1 | M2 | I1 | I2 | I3 | I4 | O1 | O2 | O3 | O4 | R1 | R2 |
| | — | 2 | 59 | — | — | 2 | 0 | 2 | 0 | 0 0 | 0 0 | 0 0 | 0 0 | 0 0 | 0 0 | 0 0 | — | TEST INP 1 | INP | — | 0 0 | 0 0 | 0 0 | 0 0 | R1 | R2 |
| | 2 | 14 | — | 3 | — | 7 | 0 | 0 | 0 | 16 | 4 | 2 | 0 | 0 | 0 0 | 0 0 | 2 | TEST 2 | INP 3 | — | 0 0 | 0 0 | 0 0 | 0 0 | — | 32 |
| 1 | 3 | 4 | 59 | — | 2 | 4 | 0 | 2 | T | 0 0 | 0 0 | 2 | 0 | 0 | 0 0 | 0 0 | 0 0 | 0 0 | 0 0 | 0 0 | 0 0 | 0 0 | 0 0 | 0 0 | 2 | 9 |
| 2 | 4 | 16 | 22 | 3 | 3 | 8 | 9 | — | T | 28 | 8 | 0 0 | 0 | 0 | | | | | | | | | | | | |
| | 0 0 | 0 0 | 0 0 | 0 0 | 0 0 | 0 0 | 0 0 | 0 0 | 0 0 | 0 0 | 0 0 | 0 0 | 0 0 | 0 0 | | | | | | | | | | | | |
| 3 | 8 | 28 | 38 | 3 | 4 | 18 | 17 | — | T | 40 | 18 | 2 | 0 | 0 | | | | | | | | | | | | |
| | 0 0 | 0 0 | 0 0 | 0 0 | 0 0 | 0 0 | 0 0 | 0 0 | 0 0 | 0 0 | 0 0 | 0 0 | 0 0 | 0 0 | | | | | | | | | | | | |
| 4 | 18 | 40 | 46 | 4 | 8 | 25 | 0 | 2 | F | 52 | 25 | 3 | 0 | 0 | | | | | | | | | | | | |
| | 0 0 | 0 0 | 0 0 | 0 0 | 0 0 | 0 0 | 0 0 | 0 0 | 0 0 | 0 0 | 0 0 | 0 0 | 0 0 | 0 0 | | | | | | | | | | | | |
| 5 | 25 | 52 | 29 | 3 | 18 | 24 | 32 | — | F | | | | | 0 0 | | | | | | | | | | | | |

| EXE SEQ | \multicolumn{9}{c|}{EXECUTION TABLE} | \multicolumn{5}{c|}{TOKEN TABLE} | MAX INPUTS TABLE | | INPUTS TABLE | | | | OUTPUTS TABLE | | | | RETURN STACK TABLE | |
|---|---|---|---|---|---|---|---|---|---|---|---|---|---|---|---|---|---|---|---|---|---|---|---|---|---|
| | E1 | E2 | E3 | E4 | E5 | E6 | E7 | E8 | E9 | T1 | T2 | T3 | T4 | T5 | M1 | M2 | I1 | I2 | I3 | I4 | O1 | O2 | O3 | O4 | R1 | R2 |
| 00 | 00 | 00 | 00 | 00 | 00 | 00 | 00 | 00 | 00 | 00 | 00 | 00 | 00 | 00 | 00 | 00 | | TEST 1 | INP | | | OUT 1 | OUT | 31 | | 1 | 32 |
| | | | | | | | | | | | | | | | | | 2 | TEST 2 | INP 3 | — | — | — | — | — | 2 | 9 |
| 1 | 16 | 38 | 39 | 3 | 15 | 22 | 2 | — | T | 38 | 16 | 0 | 0 | 0 | 00 | 00 | 00 | 00 | 00 | 00 | 00 | 00 | 00 | 00 | 00 | 00 |
| 2 | 25 | 52 | 29 | 3 | 18 | 24 | 32 | — | F | 00 | 00 | 2 | 0 | 0 | | | | | | | | | | | | |
| 3 | 24 | 51 | 6 | 3 | 25 | 23 | 0 | — | F | 50 | 22 | 0 | 0 | 0 | | | | | | | | | | | | |
| 4 | 23 | 39 | 10 | 3 | 24 | 21 | 0 | — | F | 51 | 24 | 2 | 0 | 0 | | | | | | | | | | | | |
| 5 | 21 | 38 | 39 | 3 | 23 | 22 | 0 | — | F | 52 | 25 | 0 | 0 | 0 | | | | | | | | | | | | |
| 00 | 22 | 50 | 54 | 5 | 16 | 31 | 0 | 2 | T | 00 | 00 | 3 | 0 | 00 | | | | | | | | | | | | |
| 6 | 31 | 62 | 60 | 2 | 22 | — | 0 | — | T | | | | | | | | | | | | | | | | | |
| 00 | 00 | 00 | 00 | 00 | 00 | 00 | 00 | 00 | 00 | | | | | | | | | | | | | | | | | |

524 — EXECUTION TABLE
544 — TOKEN TABLE
550 — MAX INPUTS TABLE
558 — INPUTS TABLE
560 — OUTPUTS TABLE
582 — RETURN STACK TABLE

FIG. 37.

EXECUTION TABLE (524)

| EXE SEQ | E1 | E2 | E3 | E4 | E5 | E6 | E7 | E8 | E9 |
|---|---|---|---|---|---|---|---|---|---|
| 0 | 0 | 0 | 0 | 0 | 0 | 0 | 0 | 0 | 0 |
|   | 18 | 40 | 46 | 4 | 8 | 25 | 0 | 2 | F |
| 0 | 0 | 0 | 0 | 0 | 0 | 0 | 0 | 0 | 0 |
| 1 | 32 | 52 | 29 | 3 | 18 | 33 | 34 | 1 | F |
| 2 | 33 | 64 | 60 | 2 | 32 | 2 | 0 | 0 | F |
| 0 | 0 | 0 | 0 | 0 | 0 | 0 | 0 | 0 | 0 |

TOKEN TABLE (544)

| T1 | T2 | T3 | T4 | T5 |
|---|---|---|---|---|
| 0 | 0 | 0 | 0 | 0 |

MAX INPUTS TABLE (550)

| M1 | M2 |
|---|---|
| 0 | 0 |

INPUTS TABLE (558)

| I1 | I2 | I3 | I4 |
|---|---|---|---|
| 1 | TEST INP 1 | INP | 1 |
| 2 | TEST INP 2 | INP | 3 |

OUTPUTS TABLE (560)

| O1 | O2 | O3 | O4 |
|---|---|---|---|
| 1 | OUT 1 | OUT | 31 |
| 2 |    | OUT | 33 |

RETURN STACK TABLE (582)

| R1 | R2 |
|---|---|
| 1 | 34 |
| 2 | 9 |

| EXE SEQ | EXECUTION TABLE | | | | | | | | | TOKEN TABLE | | | | | MAX INPUTS TABLE | | INPUTS TABLE | | | | OUTPUTS TABLE | | | | RETURN STACK TABLE | |
|---|---|---|---|---|---|---|---|---|---|---|---|---|---|---|---|---|---|---|---|---|---|---|---|---|---|---|
| | E1 | E2 | E3 | E4 | E5 | E6 | E7 | E8 | E9 | T1 | T2 | T3 | T4 | T5 | M1 | M2 | I1 | I2 | I3 | I4 | O1 | O2 | O3 | O4 | R1 | R2 |
| o o | o o | o o | o o | o o | o o | o o | o o | o o | o o | o o | o o | o o | o o | o o | o o | o o | o o | o o | o o | o o | o o | o o | o o | o o | o o | o o |
| 1 | 34 | 52 | 29 | 3 | 18 | 28 | 0 | 1 | F | 54 | 29 | 3 | 0 | 0 | 0 | 0 | 1 | TEST INP 1 | 1 | 1 | 1 | OUT 1 | OUT 31 | 31 | 1 | 9 |
| 2 | 28 | 53 | 7 | 3 | 34 | 26 | 0 | 0 | F | | | | | | | | 2 | TEST INP 2 | INP 3 | | 2 | OUT 2 | OUT 33 | 33 | | |
| 3 | 26 | 41 | 11 | 3 | 28 | 27 | 0 | 0 | F | | | | | | | | | | | | | | | | | |
| 4 | 27 | 42 | 37 | 3 | 26 | 29 | 30 | 1 | F | | | | | | | | | | | | | | | | | |
| 5 | 29 | 54 | 52 | 5 | 27 | 35 | 0 | 1 | IC | | | | | | | | | | | | | | | | | |
| o o | o o | o o | o o | o o | o o | o o | o o | o o | o o | o o | o o | o o | o o | o o | | | o o | o o | o o | o o | o o | o o | o o | o o | | |

| EXE SEQ | EXECUTION TABLE ||||||||| TOKEN TABLE |||| MAX INPUTS TABLE || INPUTS TABLE |||| OUTPUTS TABLE |||| RETURN STACK TABLE ||
| | E1 | E2 | E3 | E4 | E5 | E6 | E7 | E8 | E9 | T1 | T2 | T3 | T4 | T5 | M1 | M2 | I1 | I2 | I3 | I4 | O1 | O2 | O3 | O4 | R1 | R2 |
| --- | --- | --- | --- | --- | --- | --- | --- | --- | --- | --- | --- | --- | --- | --- | --- | --- | --- | --- | --- | --- | --- | --- | --- | --- | --- | --- |
| 1 | 5 | 7 | 59 | 1 | 3 | 6 | 0 | 2 | T | 0 | 0 | 0 | 0 | 0 | 0 | 0 | 1 | TEST 1 | INP 1 | 1 | 1 | OUT 1 | OUT 31 | 31 | 0 | 0 |
| 2 | 6 | 19 | 1 | 3 | 5 | 13 | 0 | 0 | T | 42 | 19 | 3 | 0 | 0 | 0 | 0 | 2 | TEST 2 | INP 3 | 3 | 2 | OUT 2 | OUT 33 | 33 | 0 | 0 |
| 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | | | 3 | TEST 3 | INP 5 | 5 | 3 | OUT 3 | OUT 35 | 35 | | |
| 3 | 13 | 31 | 1 | 3 | 6 | 20 | 0 | 0 | T | 0 | 0 | 0 | 0 | 0 | | | | | | | | | | | | |
| 0 0 | 0 0 | 0 0 | 0 0 | 0 0 | 0 0 | 0 0 | 0 0 | 0 0 | 0 0 | 54 | 29 | 3 | 0 | 0 | | | | | | | | | | | | |
| 4 | 20 | 43 | 8 | 3 | 13 | 30 | 0 | 0 | T | 0 | 0 | 0 | 0 | 0 | | | | | | | | | | | | |
| 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | | | | | | | | | | | | |
| 5 | 30 | 42 | 37 | 3 | 20 | 29 | 0 | 1 | T | | | | | | | | | | | | | | | | | |
| 6 | 29 | 54 | 52 | 5 | 27 | 35 | 0 | 3 | T | | | | | | | | | | | | | | | | | |
| 0 0 | 0 0 | 0 0 | 0 0 | 0 0 | 0 0 | 0 0 | 0 0 | 0 0 | 0 0 | | | | | | | | | | | | | | | | | |
| 7 | 35 | 66 | 60 | 2 | 29 | 3 | 0 | 0 | T | | | | | | | | | | | | | | | | | |
| 0 0 | 0 0 | 0 0 | 0 0 | 0 0 | 0 0 | 0 0 | 0 0 | 0 0 | 0 0 | | | | | | | | | | | | | | | | | |

LOGIC DIAGRAM COMPILER/EXECUTOR

CROSS REFERENCE TO MICROFICHE

The present invention includes pseudocode program logic operation descriptions, record format descriptions and program documentation as microfiche appendices I and II where appendix I includes 186 frames on 3 fiche, appendix II includes 42 frames on 1 fiche for a total of 228 frames and 4 fiche.

BACKGROUND OF THE INVENTION

1. Field of the Invention

The present invention relates to a logic diagram compiler/executor used for design of a logic system such as the actuation logic for engineered safeguard functions in a nuclear power plant and to the production of a logic diagram representation that can be executed using truth tables representing the different logic functions and, more particularly, the present invention includes a method of interactively creating a logic diagram representing actuation logic when the diagram is free from errors, creating a tabular representation of the logic diagram and executing the tabular representation to produce the desired outputs.

2. Description of the Related Art

In a nuclear power plant, engineered safeguard functions consist of actions to be taken to mitigate damage and ensure safety under abnormal or emergency conditions. These actions may be initiated manually, by means of pushbuttons or automatically, based on inputs from sensors which can transmit information concerning process variables and the states of actuated devices such as valves and pumps. To control the actuated devices necessary to implement the desired safeguard functions, the sensor inputs are processed by redundant logic networks which generate outputs through a power interface to energize or deenergize the proper devices in the proper sequences subject to any required enabling or interlock signals.

To design the logic for a nuclear power plant, a fluid systems engineer reduces the desired safeguard actions to a sequence of operations of various fluid control devices such as valves and pumps. The engineer then transposes the sequence of operations into the form of a logic or interlock sketch. The logic sketch is used by the engineer to develop a logic diagram and the necessary circuitry for the elementary wiring diagrams. The elementary wiring diagrams for a hardware circuit which is functionally equivalent to the logic diagram is created. The task of creating the logic diagram, subsequent wiring diagrams and the hard wired logic is very time-consuming and costly.

SUMMARY OF THE INVENTION

It is an object of the present invention to speed up and lower the cost of development of logic networks.

It is another object of the present invention to remove unnecessary paper work during development of the logic network.

It is a further object of the present invention to provide a logic diagram representation that is executable by software to replace the hard wired logic.

It is also an object of the present invention to provide a testable logic diagram representation that does not need to be built in hard wired form.

It is a further object of the present invention to provide an interactive method of creating a logic diagram and a software representation of the logic diagram which can be executed to produce the desired outputs.

The above objects can be accomplished by an interactive method of creating a logic diagram as a dynamic diagram grid on a computer display. The method allows the designer to pick desired logic elements from a menu and connect the elements using menu selectable connectors. The diagram can be edited as created and tested to ensure that it is complete using a generic logic element shape. As the diagram is being created, an equation list is produced in tabular form which represents the diagram. Powerful aids such as macros are available to speed up the creation process. When the designer is finished, the equation list is converted into an intermediate equation file which is converted into an executable format which can be executed for the various logic functions of the equations.

These together with other objects and advantages which will be subsequently apparent reside in the details of the method and operation as more fully hereinafter described and claimed, reference being had to the accompanying drawings forming a part hereof, where like numerals refer to like parts throughout.

BRIEF DESCRIPTION OF THE DRAWINGS

FIGS. 1-4 illustrate the relationship between various routines in the present invention and provide the routine name mnemonics for the corresponding routines in appendix I;

FIGS. 5A and 5B depict the logic diagram shapes available in the present invention;

FIGS. 6A and 6B illustrates a logic diagram created in accordance with the present invention;

FIG. 11 is a snapshot of the equations table for FIG. 6;

FIG. 13 is a snapshot of the equations table for FIG. 6;

FIG. 17 is an equations list for FIG. 20;

FIGS. 18A and 18B form a table representing the intermediate file for FIG. 20;

FIGS. 22-30 are snapshots of the data structure and its contents as loading progresses;

FIGS. 31A-31C illustrate the data structure and contents after loading is complete;

FIGS. 33-40 are snapshots of the data structure as execution progresses through the logic diagram of FIG. 20.

DESCRIPTION OF THE PREFERRED EMBODIMENTS

The present invention is an interactive logic diagram compiler and executor which allows logic design engineers to interactively create logic diagrams such as the logic diagram for a nuclear power plant safety system. The logic diagrams can then be executed to produce the desired outputs based on input signals.

In the present invention, the logic designer sits down in front of a computer terminal or preferably a microcomputer such as COMPAQ PLUS by Compaq computer and selects appropriate logic elements from a menu. These logic elements along with selectable connection shapes are added to a dynamic diagram grid on the computer display. The designer can edit the diagram by moving elements to different locations, deleting unneeded elements or adding new elements as desired. The designer can have the logic diagram checked for consistency by the computer at any time to ensure that the logic diagram is complete. During the creation of the logic diagram, an equations list is created which represents the logic elements and connections on the dynamic grid. The equations list can be converted into an executable form which can be executed to produce the outputs of the logic diagram. For simplicity of expression and understanding, throughout the discussion herein the term "equation" is used when discussing a record that represents a logic equation, each "equation" is not actually an equation in the true sense of a logic equation but a record representing the equation.

The present invention is preferably implemented in a language such as ANSI Standard FORTRAN 77 using a compiler such as Microsoft FORTRAN Version 3.3 by Microsoft, with a preferred operating system such as Microsoft MS DOS Version 2.11.

Figure 1:
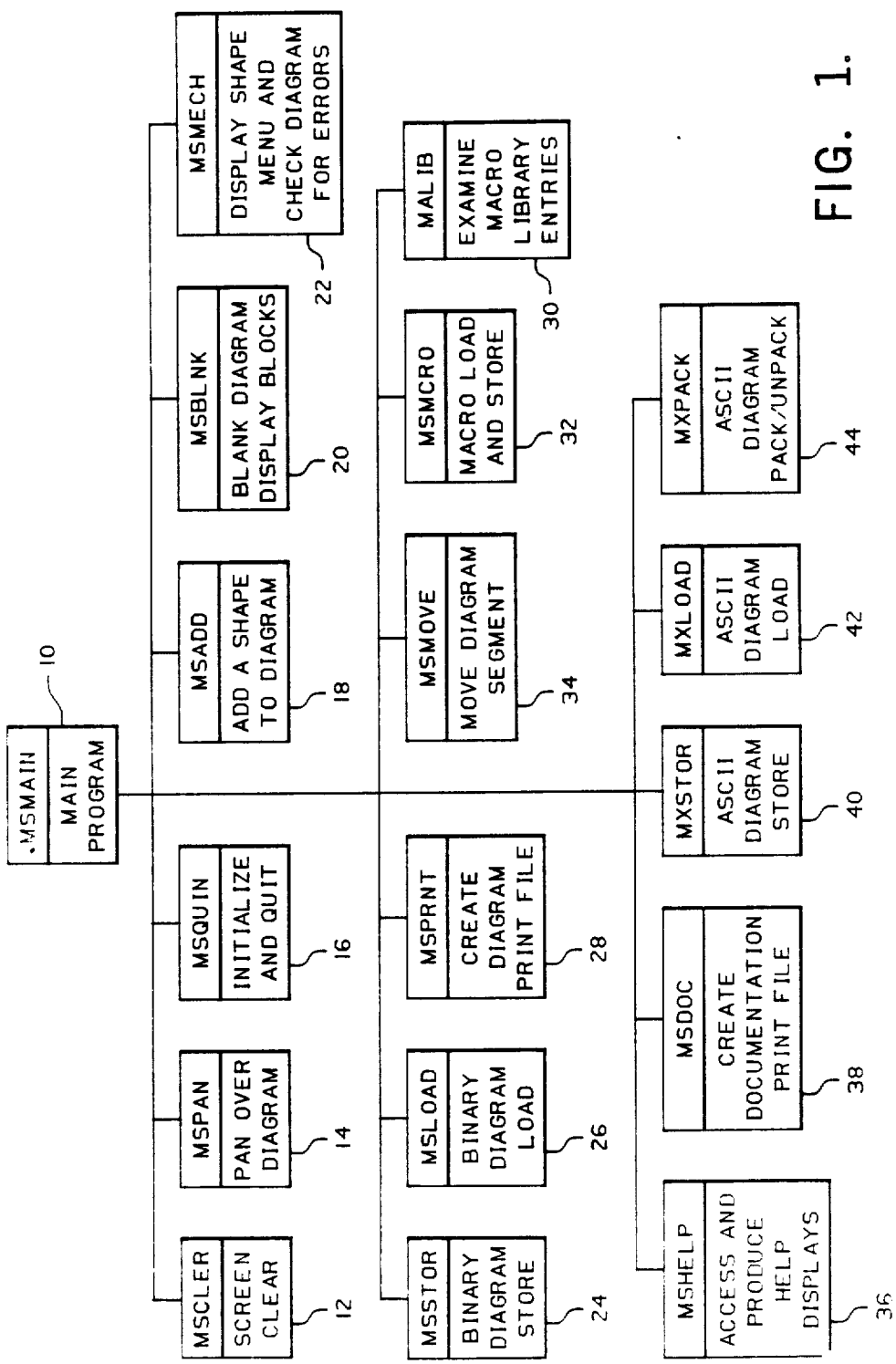
Figure 19:
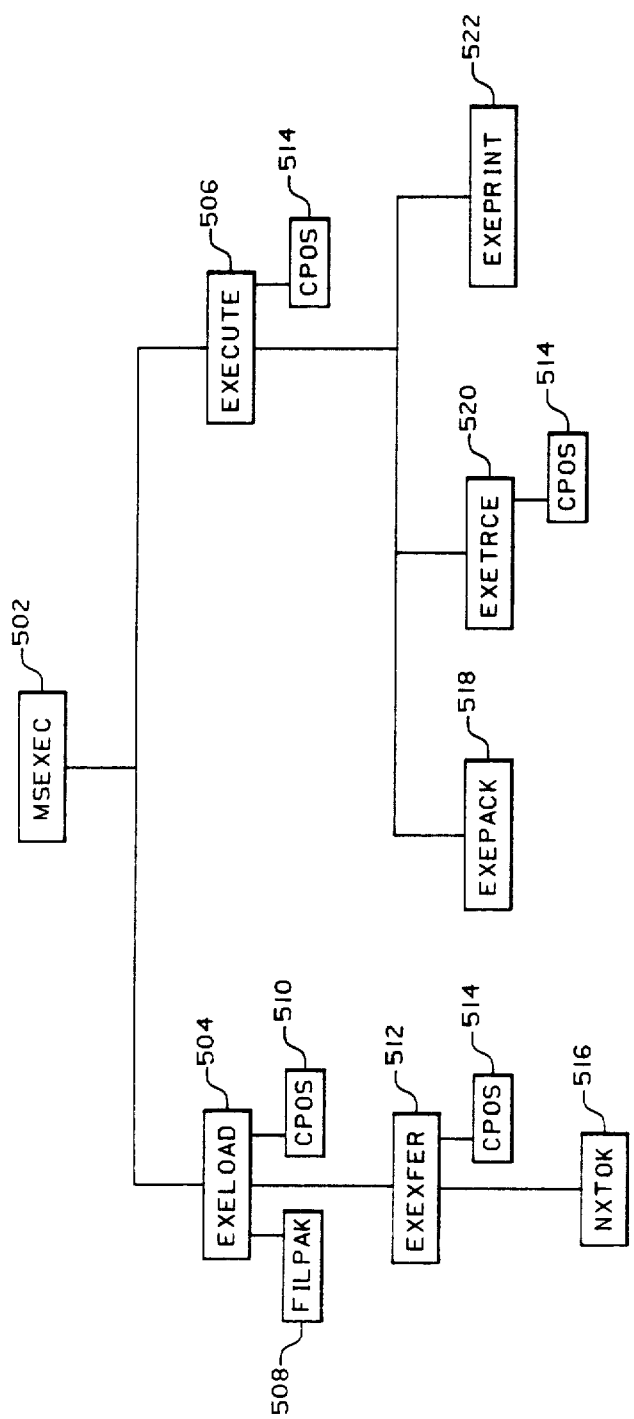
FIG. 19 illustrates the pseudocode modules of Appendix II for the loading and execution of logic diagrams.

The preferred embodiment of the compiler portion of the present invention is divided into a main program and plural subroutines as illustrated in FIGS. 1-4 which also illustrate the relationships between the various routines or modules. FIG. 1 illustrates the main logic diagram compiler routines, FIG. 2 illustrates the logic support routines, FIG. 3 illustrates the system support routines for MS DOS and FIG. 4 illustrates the general support routines. Each of the modules represented in FIGS. 1 and 2 correspond to a pseudocode module while the modules of FIGS. 3 and 4 can easily be provided by one of ordinary skill in the art. A detailed description of each module in pseudocode is provided in Appendix I. The name of each module such as MSADD (18-FIG. 1) corresponds to a pseudocode module of the same name in Appendix I. FIG. 19 illustrates the various routines of the preferred embodiment of the execution portion of the present invention. Each of these routines, except CPOS and FILPAK, are included in Appendix II as pseudocode modules with a corresponding name.

Using the pseudocode modules and the data structure diagrams presented herein, one of ordinary skill in the art can produce the appropriate source code in the preferred target language such FORTRAN 77 or can produce source code in a different target language as desired. The functions and operation of each of the modules will be described herein, however, for programming details the reader is requested to review the pseudocode in Appendices I and II.

The present invention provides one approach to creating high resolution logic diagrams and the associated Boolean equations. The present invention employs a user friendly electronic spread sheet approach to the entry of logic diagrams into the computer. All commonly used diagram shapes are entered at the user's chosen grid location by specifying the "shape mnemonic" and the grid "index" (or coordinates) where the shape is to be placed. As the user is adding the desired shapes to the diagram grid, associated Boolean equations are also being created and added to an internal equation list. When the diagram is complete, the equation list is processed (reduced) to produce the final set of equations or an intermediate equation file that may be subsequently linked and downloaded to a target microprocessor based logic processor for execution.

Figure 5B:
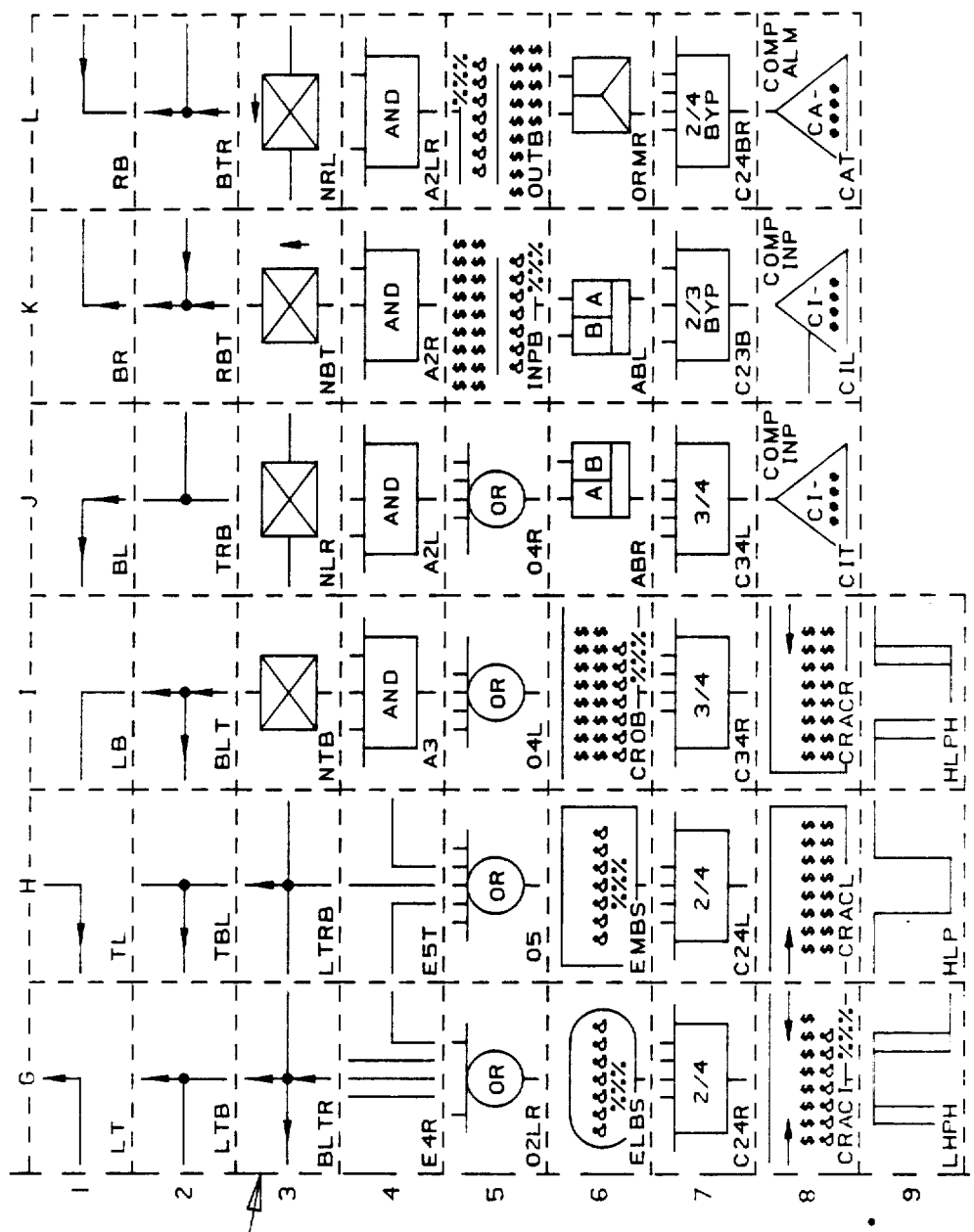
Figure 6A:
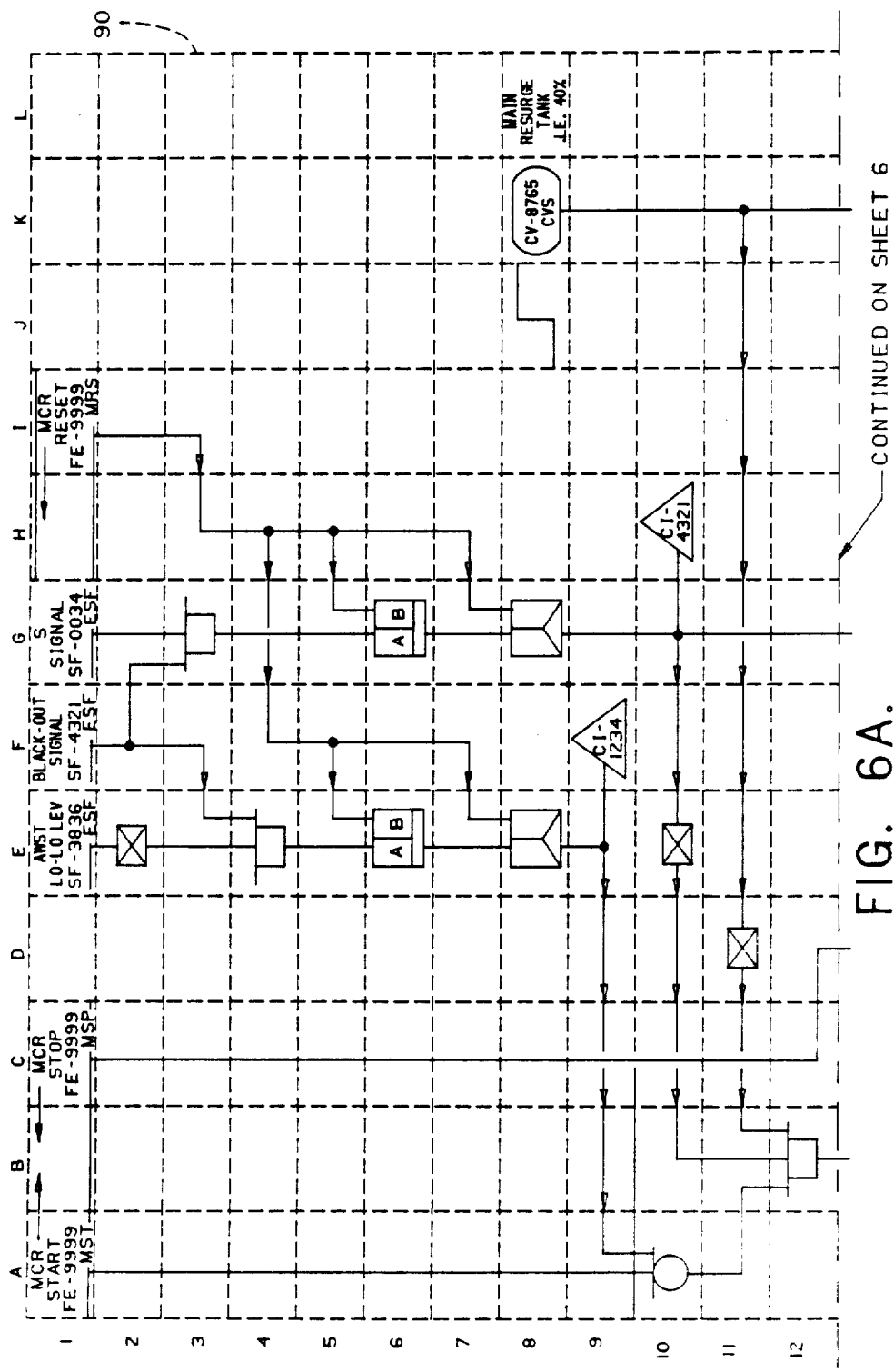

The user selects shapes from a shape menu as illustrated in FIG. 5 and transfers the shapes to a 12 by 24 dynamic grid of display blocks as illustrated in FIG. 6. The shape menu includes shapes for passing signals through a display block (see FIG. 5 indices A1-H3), shapes for inverting a signal (I3-L3), shapes for gathering signals to input into a logic element (A4-H4), logical AND symbols having a variable number of inputs (I4-C5), logical OR symbols (D5-J5), input symbols (K5-I6), actuation blocks (J6-K6), off return memories (L6-A7), retentive memories (B7-C7), retentive memories and actuation blocks (D7-E7), coincidence gates or voters (F7-J7), bypass gates (K7-C8), time delay for activation and deactivation (D8-E8), a five line text block (F8), control room symbols (G8-I8), computer inputs (J8-K8), computer alarms (L8-9A), and input signal transition symbols (B9-I9). The shapes on the shape menu of FIG. 5 are commonly found in the nuclear power industry and other more appropriate shapes could be substituted therefor in a different field. The logic diagram shapes and the appropriate equations for each shape, as depicted in FIG. 5, could be expanded to include additional shapes not disclosed, as desired by the user. As will be seen in later discussions concerning the data structure of the present invention, the shapes are sequentially numbered from 1 to 144 and consist of a character space ten columns wide and five rows deep. The dynamic diagram grid is a 12×24 token grid where each token can include a shape (10 columns by 5 rows) such as the two input OR gate at index 10A in FIG. 6. The tokens, as will be seen in later figures discussing the data structure of the present invention, are numbered from 1 to 288. Each token represents a character space ten columns wide and five rows deep.

The compiler portion of the present invention includes several commands which allow the transfer of the shapes from the shape menu (FIG. 5) to the dynamic grid (FIG. 6). The function of these commands will be discussed below and the operation of these commands will be discussed in more detail later by way of example.

The Add command is the most important command and it transfers shapes from the shape memory or shape menu (FIG. 5) to the dynamic grid (FIG. 6) so that a logic diagram or a macro can be created. Most of the logic elements in the menu of shapes have logic equations associated with them, and these equations are added to the equation list representing the diagram when the shape is added to the diagram grid. The user does not need to know Boolean logic to create a correct logic diagram, since the final equations are generated automatically. Certain shapes contain text fields that are represented by "$" on the shape menu. When any of the text field shapes are moved into the dynamic diagram, the user is prompted for the specific text to be entered in the area filled with the "$", on a row per row basis. This text information becomes a permanent part of the diagram image after the Add is complete. Certain shapes contain signal identification text areas that are used to uniquely identify the input and output of the signals associates with a given diagram and are represented by "#" on the shape menu of FIG. 5. Signal identification is added by defining a seven character component/system ID, followed by a three character descriptor tag. The combination of the two provides a unique ten character signal identifier. As each shape is entered into the diagram, it may be automatically checked to see if it logically fits at the designated location. If not, a diagnostic is printed and the ADD is aborted. This diagnostic feature can be turned off.

The Initialize command allows the user to initialize the present invention and bring it up to the original entry state where the diagram grid can be manipulated.

The Clear command clears all shapes from the diagram grid, clears all linked text fields, clears all accumulated equations and resets internal variables so that the user can start with a clean slate.

The Move command emulates the familiar spread sheet functions "Move", "Replicate", "Insert Row", and "Insert Column". After entering "Move", the user is prompted for the upper left and lower right source indices and the upper left target index. "Move" will transfer all shapes in the source range to identical shapes in the target range. A source range option is provided to allow the source area to either remain unchanged "Replicate" or to be blanked "Move". If the target range overlays part of the source range, then the source range will be unconditionally blanked, even though the user has requested otherwise. A target range option allows overwriting old shapes that may be in the target area at the time of the requested move. The user is prompted as to whether this overwriting is wanted. If Yes, the move continues, if No, the move is aborted.

The Pan command allows the user to move the 7×4 display block view area around on the 12×24 dynamic diagram grid. The command allows the arrow keys on a terminal to be used for slow pan, or a number to be entered to jump to one of the twelve dynamic diagram display regions. If a high resolution larger display is available, the user viewing area could be expanded to encompass the entire 12×24 block grid, thus eliminating the need for this command that results from the limited size display of the preferred computer.

The Blank command allows the user to clear out portions of the dynamic diagram grid by selecting the upper left and lower right indices ("coordinates") of a rectangle to be cleared or blanked.

The Load command loads previously stored diagrams (stored via the Store command) into the diagram grid for editing, viewing or printout.

The Store command stores the current diagram on a magnetic disk in binary format either under a name that the user enters at a prompt or under a name by which it was loaded.

The Check command verifies that every shape in the dynamic diagram grid is properly connected to its neighbors.

The Macro command allows diagram fragments (rectangles) that are repeated frequently on one diagram, or used on a number of different diagrams, to be repeated. Macros contain no specific text or signal ID's and when loaded, the user is prompted for the new text and signal information. Macros are stored in relative format and hence, may be loaded anywhere on an existing diagram as long as the macro boundary is within the diagram boundary and no macro block overwrites an existing diagram block. A macro can be as small as two token blocks or as large as an entire diagram, and a large macro can be comprised of many smaller macros. This capability can be a time saver in the building of diagrams which have similarities. Macros are stored in special disk files called "Macro Libraries". Each "Macro Library" has a unique user assigned name. Each "Macro Library" contains up to 20 individual macros. Macro maintenance is performed by the Macro Library function.

The Macro Library Function allows the user to perform maintenance on the user libraries the user has previously created. Using this function, the user may review macros stored in a specified library or delete a macro from a specified library.

The Print command creates a print file of the diagram currently on the grid. The file is sent to the printer of the user's choice. Page 1 of the printout contains tabular information including a list of specific inputs and outputs used in the diagram, listing the signal ID, signal description, signal origin/destination and other information. Equation printout follows the I/O signal printout. The last two pages of the printout will be the actual diagram.

The Quit command provides an exit from the present invention to the operating system level of machine software.

The Load Extended command allows diagrams that were previously stored to be loaded into the dynamic diagram grid for editing, viewing or printout.

The Store Extended command stores the logic diagram currently residing on the dynamic grid to the intermediate equation disk file as a series of ASCII records.

The Pack command combines several individual ASCII logic diagrams into a single file for easy interchange with other computer systems. The Unpack command operates on a previously created Packed file and creates individual ASCII logic diagram files from the packed file.

As mentioned previously, the operation of the present invention is initiated by an Initiate command which asks the operator specific questions to which the operator can specifically respond or default, as discussed below. When the Initiate command is entered, the MSQUIN routine 16 (FIG. 1) as set forth in the pseudocode of Appendix I is executed. The first question asked of the operator is whether the operator wants the shape mnemonics displayed on the dynamic grid associated with the shape. The operator is next asked whether the check routine, MSMECH 22 (FIG. 1) should be executed after each shape is transferred to the dynamic diagram. The check routine confirms whether the diagram is complete each time it is executed and points out inconsistencies therein. The operator is also allowed to enter a component name for the diagram along with a diagram name. In addition, the operator is allowed to enter creation and revision dates for the diagram along with the logic designer's name. The last initiate option is the Autosave feature. This function, if activated, allows the user to specify a save interval in terms of the number of diagram changes, from 1 to 99, after which the system will automatically save the diagram to disk. If a power failure should occur or the user accidentally does a clear function, the Autosave feature will have saved the diagram so that work can continue from a previous point. Default for this option is a save after every four changes. Once initialization is completed, the user can begin to move shapes from the shape library (FIG. 5) to the dynamic diagram grid (FIG. 6).

To begin moving shapes, the Add command is entered and the user is asked to enter a shape by keying in a shape mnemonic which corresponds to the mnemonics indicated in FIG. 5. An alternate way of indicating a particular shape is to provide a touch sensitive entry tablet which includes a shape menu. For example, if the user enters A3, the shape for a three input OR gate, as illustrated in block D5 of FIG. 5, will be the shape moved to the dynamic grid. After the mnemonic is entered, the user is asked for a target index which corresponds to the indices 1-24 and A-L in the dynamic diagram grid 90 of FIG. 6. If the shape includes text fields, the user is prompted for the text of the various rows in any text field. In FIG. 6, the first 8 entries on the diagram corresponding to indices A1-I1 represent input signals which include such text fields.

During an Add function which is controlled by MSADD 18 (FIG. 1), two separate operations can occur. In the shapes located by the indices A1-I1 (FIG. 6), both operations occur. The first is the creation and entry of the text in the dynamic diagram grid and an associated entry in the text data base to be discussed in more detail hereinafter. The text operations are performed by the routine MSADTX 48 (FIG. 2) which is called by the MSADD 18 (FIG. 1). The second operation that occurs is the creation and entry of an equation into the equation list which will be discussed in more detail hereinafter. The routine that performs this function is the MSADEQ 46 (FIG. 2) routine which is also called by MSADD 18 (FIG. 1). During the addition of the shapes at A1-I1, if the Autosave feature is set (active) for a save after four changes, two Autosaves would occur. After the completion of each shape addition, the MSADD routine returns to MSMAIN 10 and MSMAIN checks to see if there is anything pending before prompting the user for new additions. If an Autosave flag is active, the MSSTOR 24 routine saves a binary image of the diagram which includes the equation list and text buffers which have accumulated to this point onto disk. If a power failure occurs at any point, a binary load of the file can be accomplished to restore the work to this point.

Figure 7:
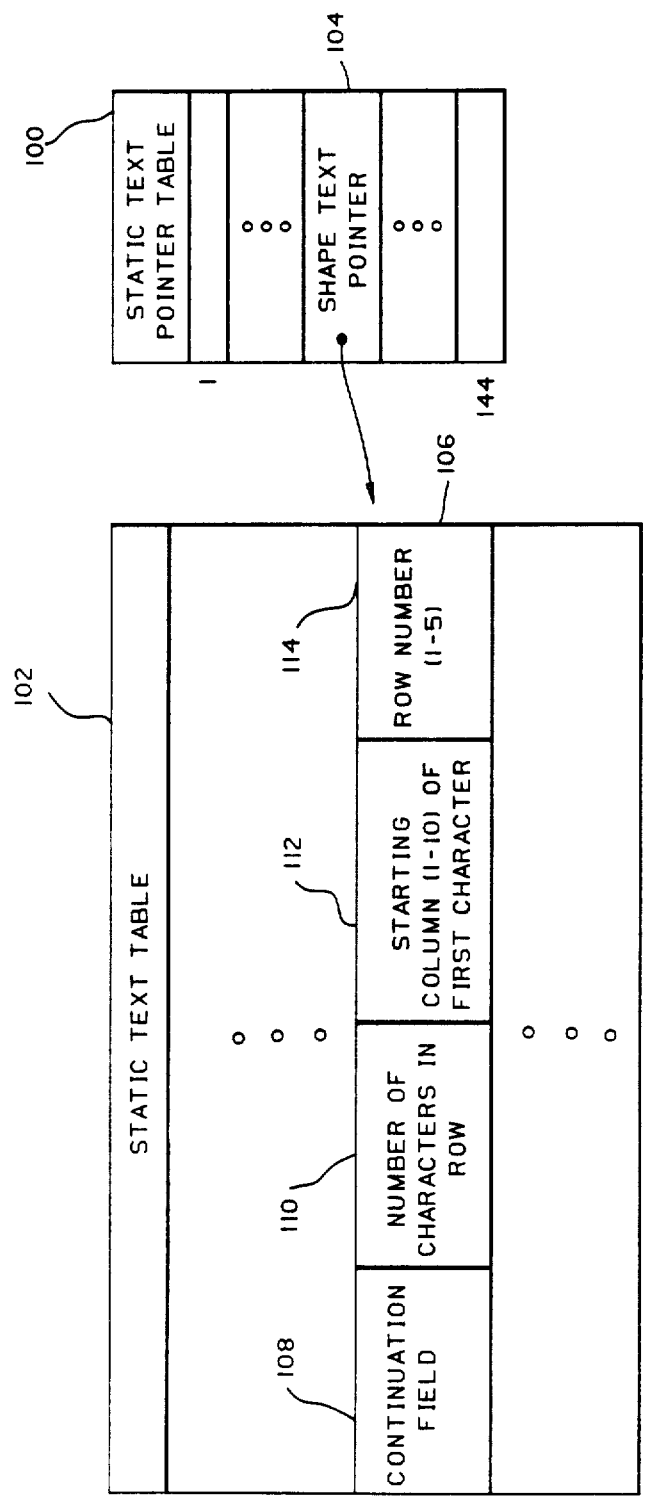
FIG. 7 illustrates a static text definition table.
Figure 8:
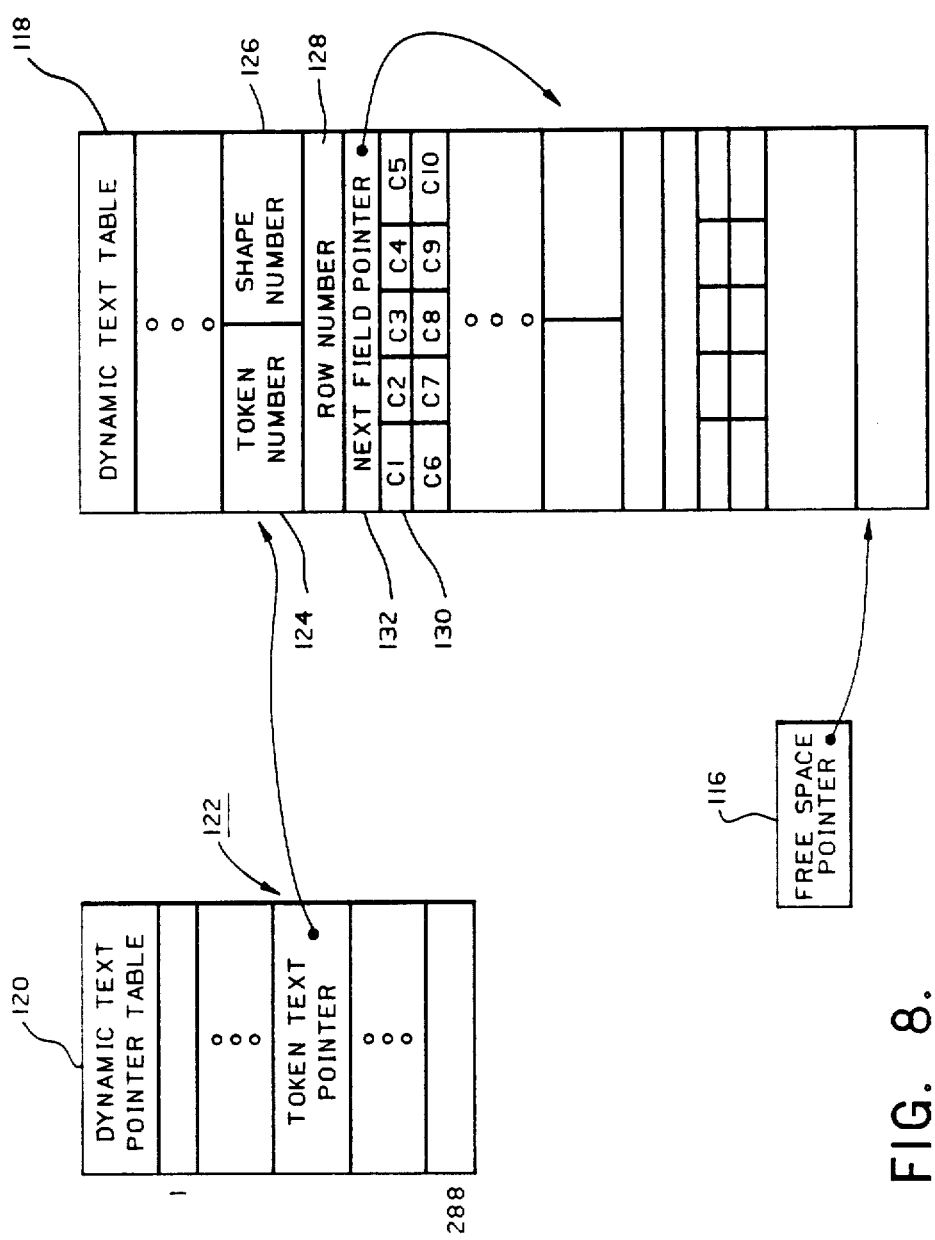
FIG. 8 illustrates the dynamic text table created from the table of FIG. 7.

The representation of text in the present invention includes a static data structure, as illustrated in FIG. 7, from which the format of the text for a index in the dynamic grid 90 (FIG. 6) is obtained. From the format, a dynamic data structure is created, as illustrated in FIG. 8, in which the text for the dynamic grid 90 is actually stored. That is, the static text data structure is used to indicate what should be entered into the dynamic structure and the dynamic structure is used to overlay the dynamic grid 90 each time the dynamic grid 90 is displayed.

The static text pointer table 100 and the static text table 102 of FIG. 7 are created during an initialization when the static text table is loaded into memory as a predefined file. The static text pointer table 100 includes a shape text pointer 104 for each of the possible 144 shapes available on the shape menu. When a shape mnemonic is entered after an Add command is initiated, the system converts the mnemonic into a pointer number and retrieves the pointer 104 to the text definition entry 106 in the static text table 102. Because the text definition entries are randomly addressed using the shape text pointer 104, the static text table 102 is only as big as is required to store all the text definitions for the shapes. That is, if a shape does not allow for text entry, a static text table entry does not exist for that shape in table 102. The routine MSADTX uses the values in the fields of each static text table entry 106 to ask the user to enter the appropriate text in row order. The first field in the entry is a continuation field 108 and indicates, via a binary flag, whether the shape has additional rows of text. The second field 110, indicates the number of characters in this row of the shape while the third field 112 indicates the starting column for the first character in the row. The last field, 114 indicates the row number. The MSADTX program first retrieves the pointer and then finds the relevant static text definition information and uses the row number to ask the first question, that is, asks the user to enter text for the first row. As the text is entered by the user, it is stored in a ten character text buffer. When the user is satisfied with the text for the particular row, the text is transferred to the dynamic portion of the text data structure as illustrated in FIG. 8.

To transfer the text to the dynamic structure, the routine obtains a free space pointer 116 (FIG. 8) indicating the next available free space in the dynamic text table 118. The free space pointer 116 is then loaded into the dynamic text pointer table 120 as a token text pointer 122 associated with the token index previously entered by the user. That is, the token index corresponds to the position on the dynamic grid for the shape being added. The routine then enters token number 124, shape number 126 and row number 128 in the dynamic text table. Next, the routine transfers the contents of the text buffer to the text storage area 130 in the starting location corresponding to the starting column indicated by the static text table 102. If the static text table 102 indicates a continuation field, the next field pointer 132 is obtained from the free space pointer 116 and entered in the dynamic text table 118.

After the entry of the text for each row, the dynamic grid, which is 120 characters by 120 characters in size and is divided into 288 ten character by five character grid squares (tokens), is updated with the appropriate text. Each grid square is assigned a unique token number (pointer number) from 1 to 288 depending on its position in the grid. That is, the dynamic text data structure of FIG. 8 is a compressed version of the text for the dynamic grid 90 (FIG. 6) and is used to refresh or update the dynamic grid 90 each time it is updated. The maximum number of dynamic text table records which can be chained together by the next field pointer 128 is five, since the maximum number of rows of text allowable in a token is five.

Figure 9:
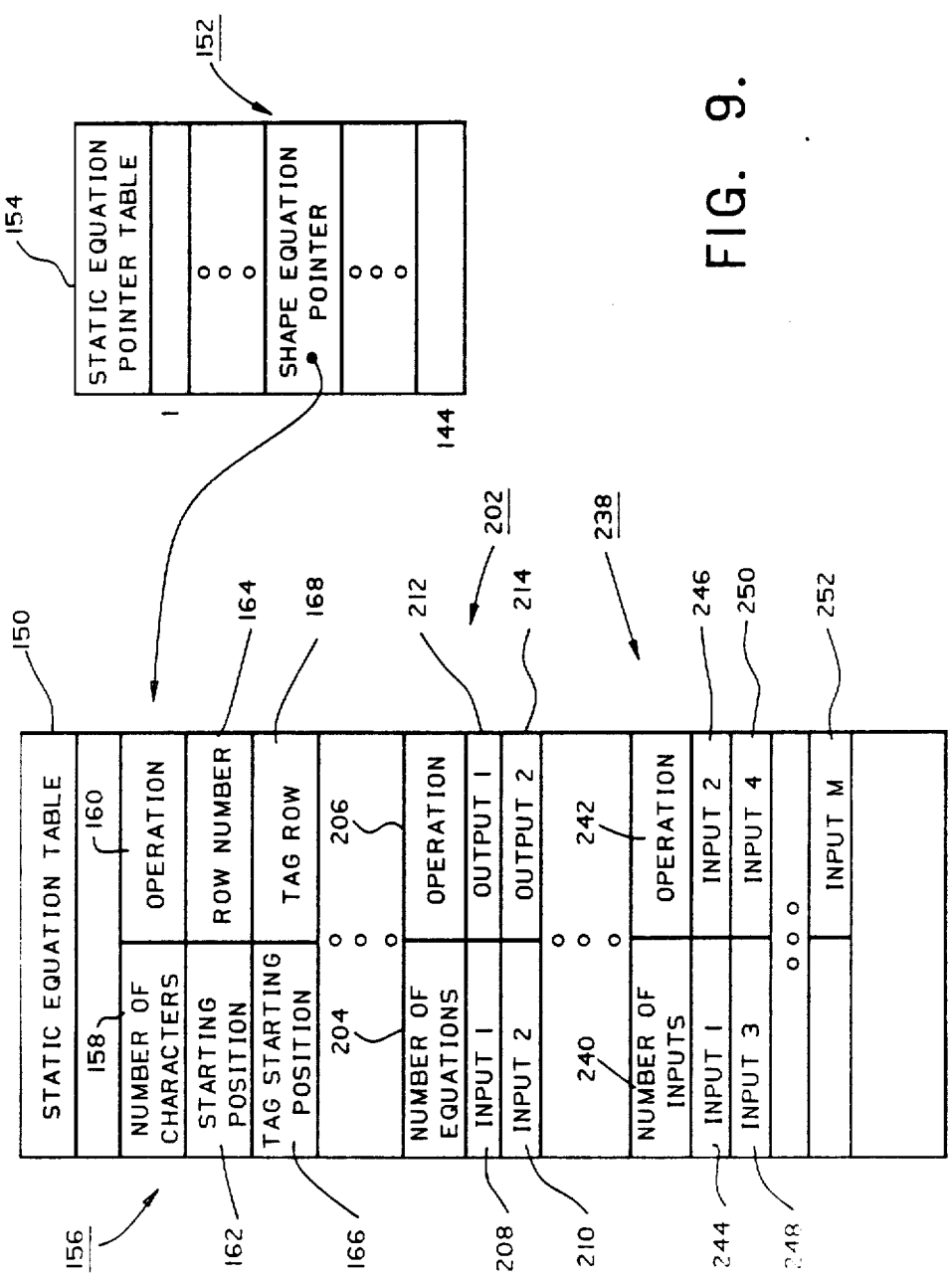
FIG. 9 illustrates a static equation definition table.

The data structure and method of transferring equations from the static version of the shape equation data base to the dynamic equation list is very similar to the method used for text as previously discussed. The entries or records in the static equation table 150, as illustrated in FIG. 9, are pointed to by shape equation pointers 152 in a static equation pointer table 154. Each shape equation pointer 152 corresponds to one of the 144 shapes selectable by the user. After the text is transferred from the static data structure to the dynamic data structure, the shape number is used to retrieve the shape equation pointer 152 which points to the associated entry in the static equation table 150. The static equation table 150 is a randomly created table which allows the table to be exactly the size needed to represent the equations for the available shapes. Several different types of equations are represented in the static equation table 150. The first type 156, represents an input/output block which is illustrated in FIG. 6 as any of the shapes at index A1-I1. The first field 158 indicates the number of characters which can be entered as a component identification. That is, the name of the component. The second field 160 indicates the type of operation. The entries 162 and 163 indicate where the signal identification or component identification text should start in the particular row. Associated with each input/output block is an identification tag of 3 characters which has a starting position 166 and a starting row 168. The other two types of static equation table records will be discussed hereinafter in association with the associated shapes as the respective shapes are introduced.

When the equation list is started, the shape index is used to obtain the shape equation pointer 152 which points to the equation definition information in the static equation table 150. The equation definition information is used to ask the user a series of questions relating to the signal identification and tag for the particular equation. There are five different types of entries possible in the equation list and at this point in our discussion of the creation of the dynamic diagram grid 90 (FIG. 6) we are discussing the creation of an equation for an input block.

Figure 10:
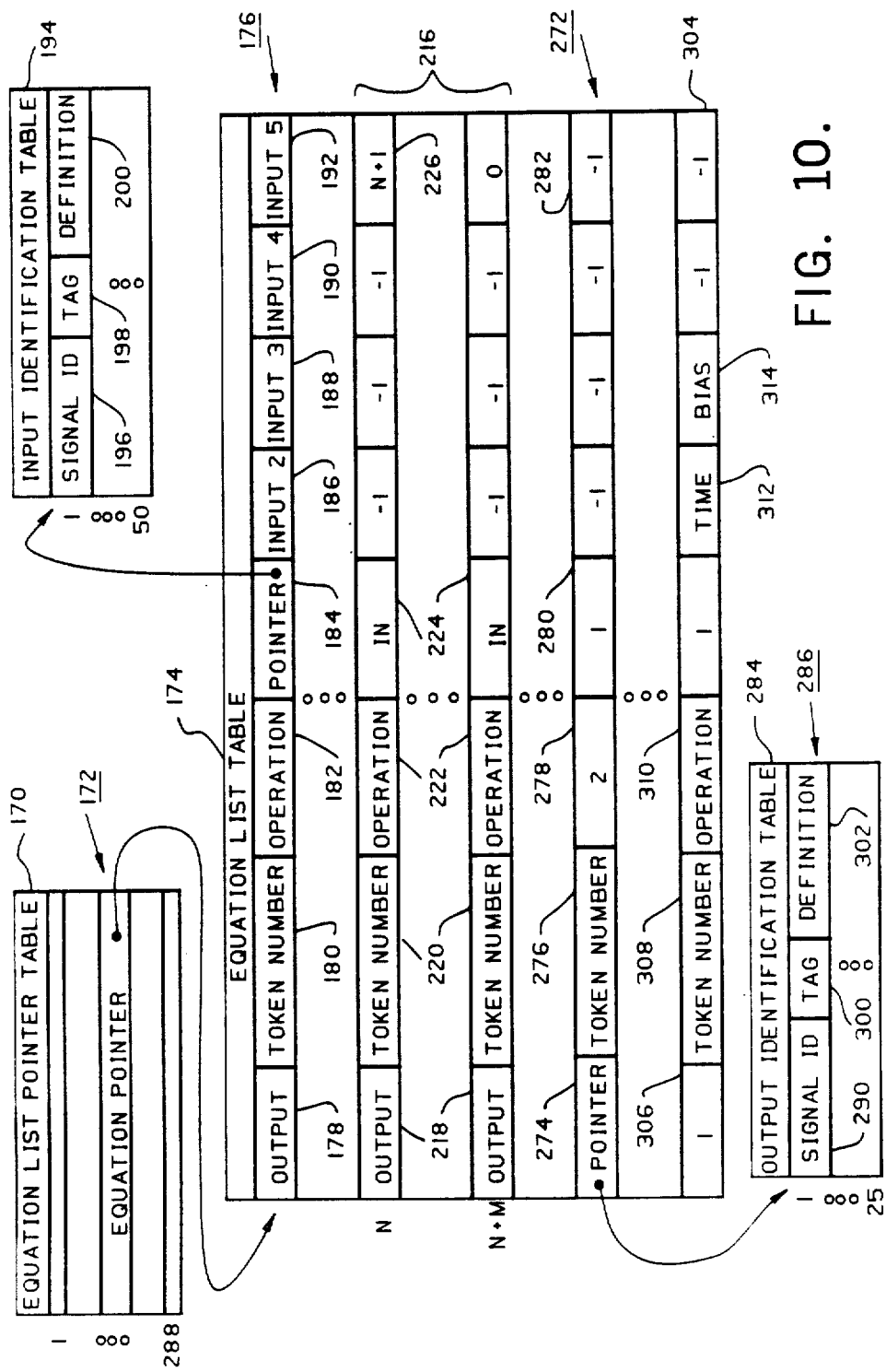
FIG. 10 illustrates a dynamic equation list table created using the definition table of FIG. 9.

The data structure for the dynamic equation list is illustrated in FIG. 10. The data structure includes an equation list pointer table 170 which includes equation pointers 172. Each pointer 172 corresponds to one of the tokens in the dynamic grid 90. Each equation pointer 172 points to an equation in the equation list table 174. The equation entry 176 for an input block includes an output field 178 indicating which output position is used by the block, a token number field 180 indicating which token in the dynamic grid 90 is represented by the equation and an operation field 182. Input fields 184-192 are normally used to indicate which positions corresponds to inputs into the token block. However, in an input block, the first input field 184 includes a pointer to an input identification table 194 which includes three text fields for each entry, that is, a signal identification field 196, a tag field 198 and a definition field which can include a user supplied sixty character description of the particular input. It is possible to have up to 288 input blocks in a grid 90, however the present invention arbitrarily limits the number of inputs to 50.

When the input blocks A1-I1 of FIG. 6 have been entered, six equations have been created as illustrated in table 201 of the equation list snap shot of FIG. 11. As can be seen from table 201, the input blocks have the same output position, different token numbers, the same operation and different input identification table pointers. The negative ones in input items 2-5 indicate unused inputs.

After the input shapes A1-I1 are entered as illustrated in FIG. 6, the user will enter the "not" diagram shape 2A into the dynamic grid 90 of FIG. 6. Once again, the user inputs the ADD command and is asked for a grid index and a shape mnemonic. When both the index and the mnemonic are entered, the present invention goes to the static equation table 150 and retrieves the shape for equations with I/O pairs illustrated in FIG. 9 at record 202. This record includes the number of equations 204 for this shape and in this situation this value will be a 1. Also included is the operation code 206 and fields 208-214 for the positions of the inputs and outputs for this equation corresponding to the generic shape of FIG. 15. The system then creates an equation 216 in the equation list of FIG. 10. This equation includes $m-1$ multiple records since each input/output pair creates an equation. The multiple records from n to $n+m$ each including an output position identifier 218, a token number 220, an operation code 222, a flag 224 indicating that input 1 is being used and a next record pointer 226 which indicates that additional records for this particular equation follow.

After the equation list is created, the two-dimensional 120 character by 120 character or 12 token by 24 token array representing the dynamic grid gets updated from the shape library. Once the shape is entered in the dynamic grid, the two-dimensional array is written out to the display using normal FORTRAN write statements.

Figure 12:
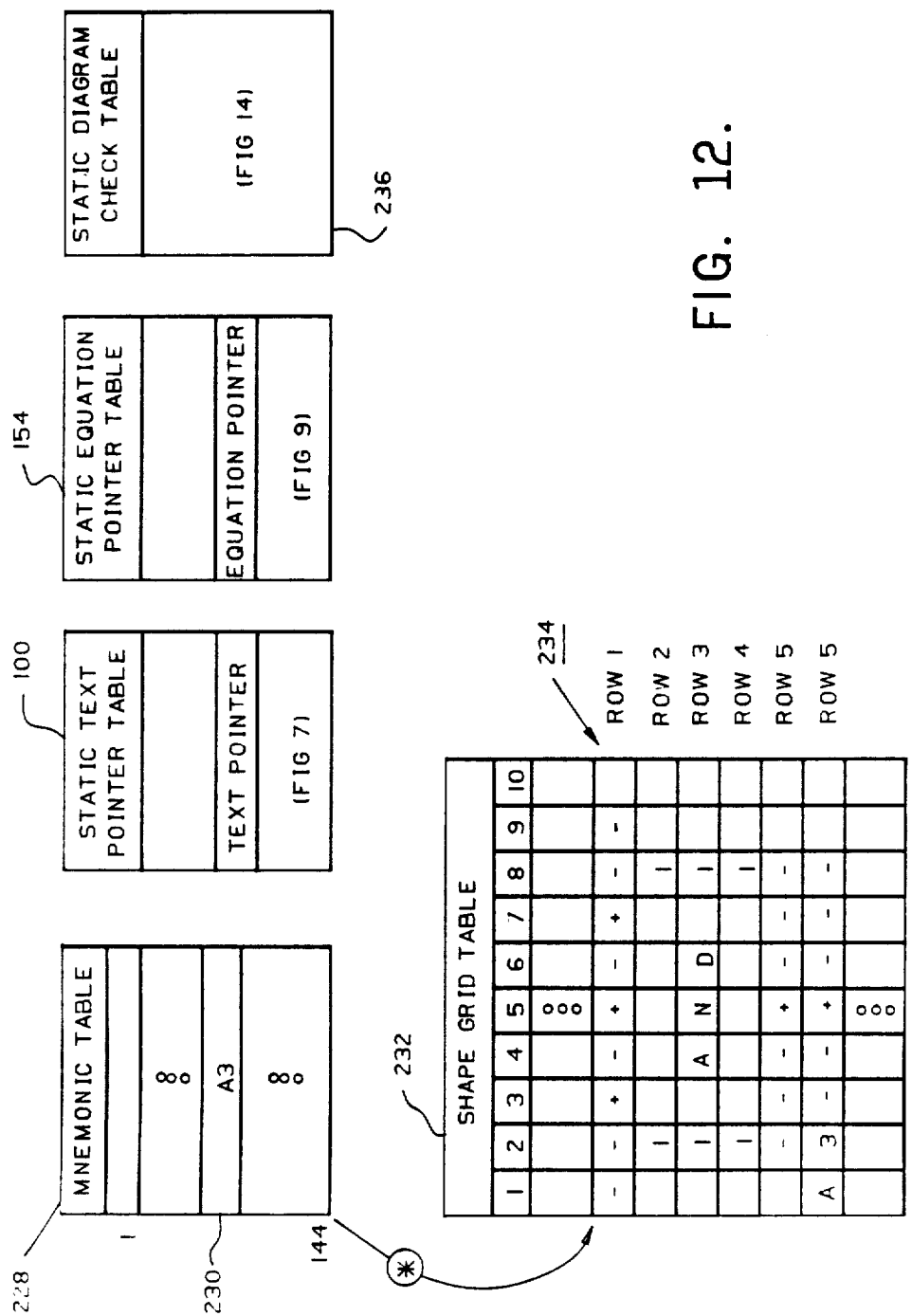
FIG. 12 illustrates a shape table used to create a token in a dynamic diagram.

The shape library from which the shape is transferred to the dynamic grid 90 is illustrated in FIG. 12. The shape library includes a mnemonic table 228 which includes as entries mnemonics up to 8 characters in length. For example, the AND mnemonic "A3" 230 represents a three input AND gate. The MSADD routine searches the mnemonic table for a match with the mnemonic entered by the user and retrieves the mnemonic number. A multiplication of the mnemonic number by six will provide a pointer into the shape grid table 232 at the appropriate location for the particular shape. Each shape represented in the shape grid table 232 includes 10 columns and 6 rows. As discussed earlier, each token within the dynamic grid 90 is a 10 column by 5 row token, however, the six rows in the shape grid table are necessary to allow the shape to be displayed with and without the shape mnemonic located in the second "ROW 5". Each of the items in the shape storage area includes an ASCII character for the character that should be deposited in the appropriate position in the token in the dynamic grid 90. At this point in the execution of the MSADD routine, the pointer to the token in the dynamic grid 90 is known as well as the pointer to the shape in the shape grid table 232. The transfer of the shape from the shape grid table 232 to the dynamic grid 90 is performed by executing a simple do loop which will transfer the characters using row and column indices as pointers. Once the transfer to the dynamic grid 90 has occurred, the MSMAIN 10 updates the user display by transferring the grid to the display memory of the computer.

Figure 14:
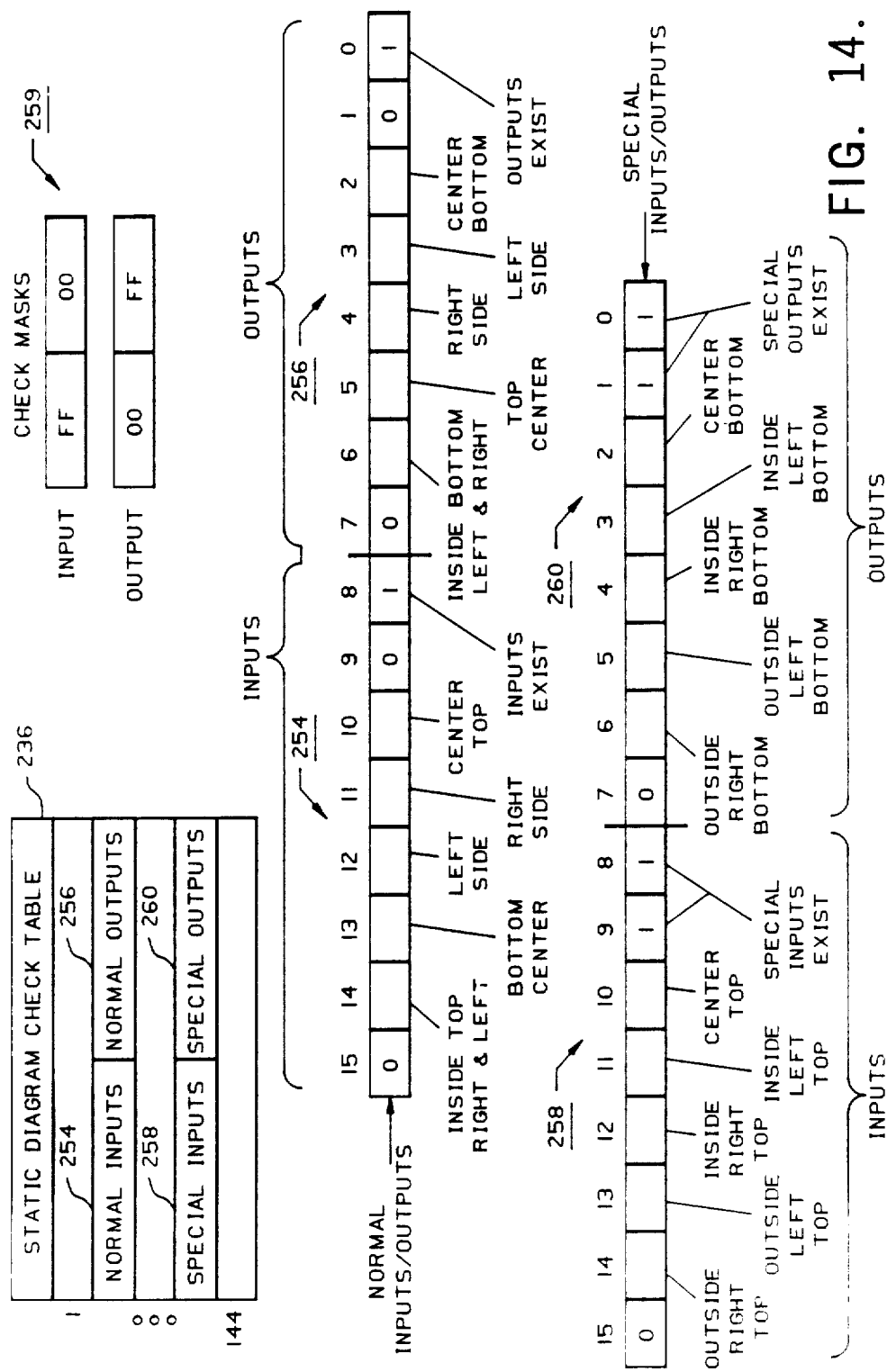
FIG. 14 illustrates the details of a table used to check the dynamic diagram for completeness.

FIG. 12 also illustrates relationships between the mnemonic table 228, static text pointer table 100 (FIG. 7), static equation pointer table 154 (FIG. 9) and a table yet to be discussed named the static diagram check table 236 (FIG. 14).

If the display monitor is not a high resolution monitor capable of displaying a 120 by 120 character display, the present invention will shift the user's viewing area so that the most recently added shape is moved toward the center of the viewing area. However, if a high resolution screen is available, the entire matrix represented by the dynamic display grid 90 can be displayed.

Continuing with the creation of the logic diagram of FIG. 6, several connector blocks 2F, 2G, 3E and 3F are entered. Each one of these shapes is entered or created by the operator entering a shape mnemonic and the destination location or index on the dynamic grid 90 for the shape. The creation of an equation for a split block such as 2F (FIG. 6) starts with the input/output pair equation definition 202 of FIG. 9 and creates an equation for each input/output pair where the equations are linked with a pointer 226 in the input column for input 5. That is, an equation 216, as illustrated in FIG. 10, is created. The other connector blocks also create equations with multiple input/output pairs as illustrated in table 237 of FIG. 13 which is a snapshot of the equations list at this point in time.

In table 237, equations 8 and 9 correspond to the branch block at F2 and the pointer which points to the next equation after equation 8 is in input column 5 and indicates that the linked equation is equation 9. The same chaining occurs between equations 10 and 11 for entry block 2G and between claims 12 and 13 for entry block 3E. Equation 14 corresponds to the connector 3F.

Figure 15:
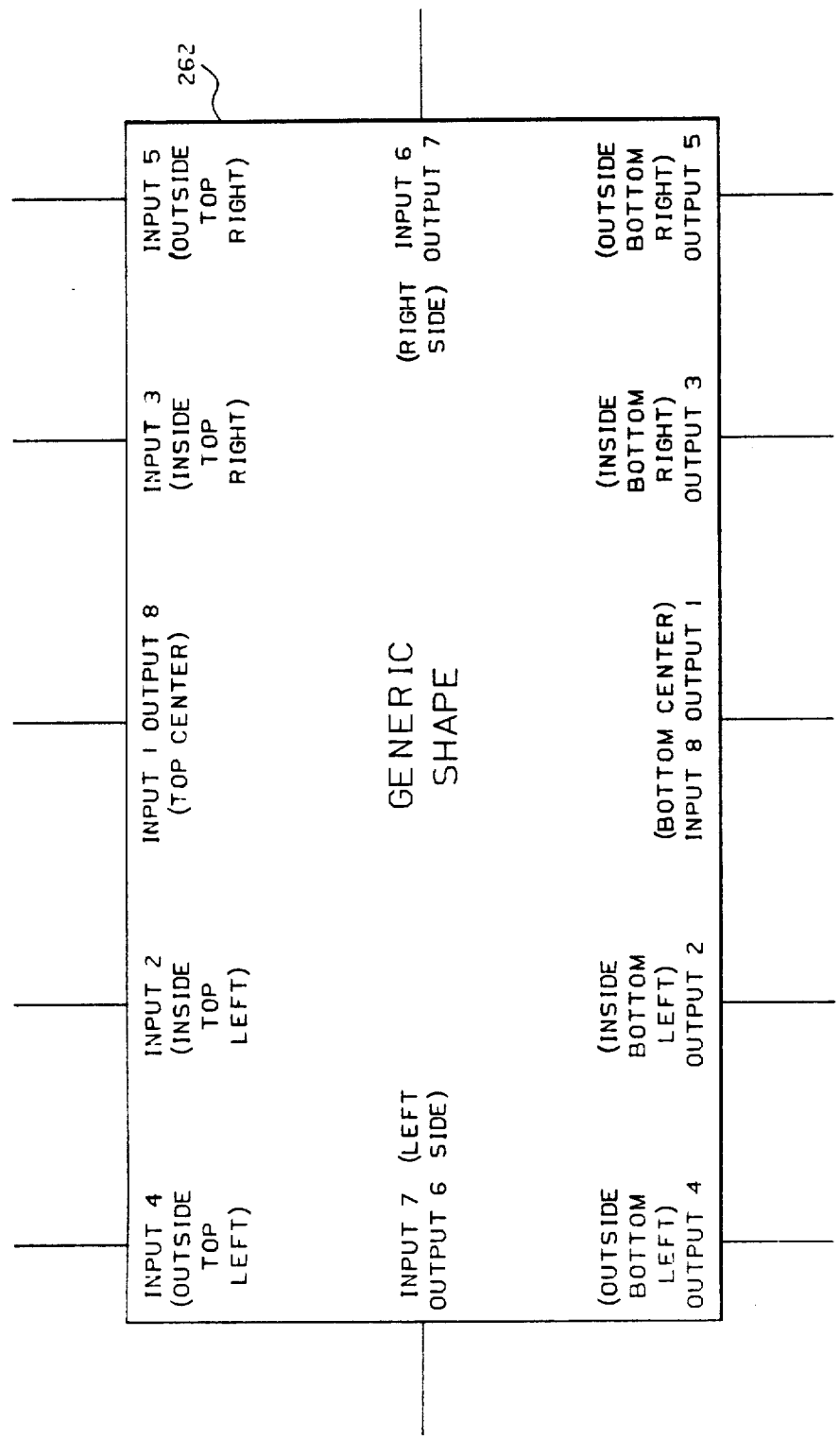
FIG. 15 is the generic shape represented by FIG. 14.

The AND gates 3G and 4E are created in the same manner as the NOT gate 2E previously discussed and only one equation results. The AND gates at 3G and 4E are represented by equations 15 and 16 in table 237. This type of equation is created from the equation definition 238 in FIG. 9. This equation includes the number of inputs for the particular shape 240, the operation 242 and input position numbers 244–252. This definition is used to create a multiple input equation in the equation list of FIG. 10 such as equation 176. However, in this created equation, the input fields 1–5 include input position numbers. Returning to the snapshot of the equations list in table 237 (FIG. 13), the operation code for both equations 15 and 16 is 4 signifying an AND and the input fields for inputs for inputs 1 and 2 in equation 15 includes a 4 and a 1, respectively, indicating that input positions 4 and 1 are used and in equation 16, input positions 1 and 5 are used (See. FIG. 15 showing the generic shape position of the inputs).

At this point during creation of the logic diagram of FIG. 6, the operator may desire to perform a check operation to ensure that the diagram created so far is complete. This check function is performed by the MSCKSH 50 routine depicted in FIG. 2 and is called by the MSADD 18 routine automatically if the check default is set to automatic and by the operator entering a Check command while in the MSMECH 22 routine. The check routine creates a dynamic version of the static diagram check table 236 illustrated in FIGS. 12 and 14.

Each entry in the table 236 corresponds to a shape and if the shape does not contain inputs and outputs, then the entry is left blank. During execution, the dynamic version of this table is created in the same way that the previous dynamic tables are created.

The data structure of FIG. 14 represents the generic shape used for checking input and output interfaces as illustrated in FIG. 15. The generic shape in FIG. 15 is symmetrical so that when a check is being performed, the input positions of each block must match the output positions of the respective neighboring blocks. As additional shapes are added to the shape library, the designer would have to create entries in the static diagram check table 236 for each new shape added. The designer can pick between two categories for each entry in the static diagram check table 236 which includes normal inputs 254 and normal outputs 256 or special inputs 258 and special outputs 260.

The check routine compares the neighbors of each token, one at a time, so at the beginning the check routine must calculate the token number of the neighboring tokens. To pick the neighbor to the right, the routine merely adds a 1 to the token number. To get the left neighbor, the token number minus 1 is used. To get the top neighbor, the token number minus 12 is used and to get the bottom neighbor the token number plus 12 is used. A border check is also conducted to see if the token has neighbors, for example, the tokens 12, 24, 36 (pointers) have no "right neighbor". Once the token numbers of the neighbors, if they exist, are determined, the routine begins the check.

The check is performed by using the normal inputs and normal outputs from the check table 236 as a check mask. The check bits of FIG. 14 correspond to the exit/entry locations on FIG. 15. If an output or input exists where indicated by the mask, the mask bit is set to "1" otherwise it is set to "0".

First, the bytes in the checkword for the token being compared are swapped or reversed in order. That is, the high-order byte becomes the low-order byte and the low-order byte becomes the high-order byte. Once the bytes are reversed, the word is used along with the neighbor's check word and a check mask to determine inputs or outputs to check the input positions and output positions (See FIG. 15) in the diagram that are not masked out between the two shapes. If the two shapes do not have equivalent input/output bits, an error is indicated. For example, if the AND gate (token #41—FIG. 13) at 4E (FIG. 6) is being checked against the input block (token #29—FIG. 13) at 3E (FIG. 6), the following sequence of events will occur. In the following discussion, the binary bit patterns of the various bytes will be converted to hexadecimal for ease of description. The I/O mask for the AND gate "A2R" which is "4705" is loaded and then byte reversed resulting in "0547". The output mask "00FF" is loaded and Anded with "0547" resulting in "0047". Next, the I/O mask "0D47" for the input block "E2R" is loaded and Anded with the output mask "00FF", resulting in "0047". Then, the result "0047" from the And gate is Xored with the result "0047" from the input block, resulting in "0000". The final result is then tested to see if all bits are zero. If true, then the shapes match or fit together, if not, then the shapes do not match.

In continuing with the creation of the diagram of FIG. 6, an actuation block 6E and an off return memory block 8E, along with various connectors are added in a manner similar to the previously discussed shapes, such that connector shapes and linked equations are created for a multiple input single output equation as depicted by 176 in FIG. 10 is created.

At this point, the diagram designer could realize that the actuation block off return memory block sequence located in columns E and F will be repeated in columns G and H of grid 90. The designer could just continue using the Add function to add the shapes for the new portion of the diagram or the logic diagram designer can create a macro and store it in the macro library and use the macro to create the new portion of the grid 90.

Figure 16:
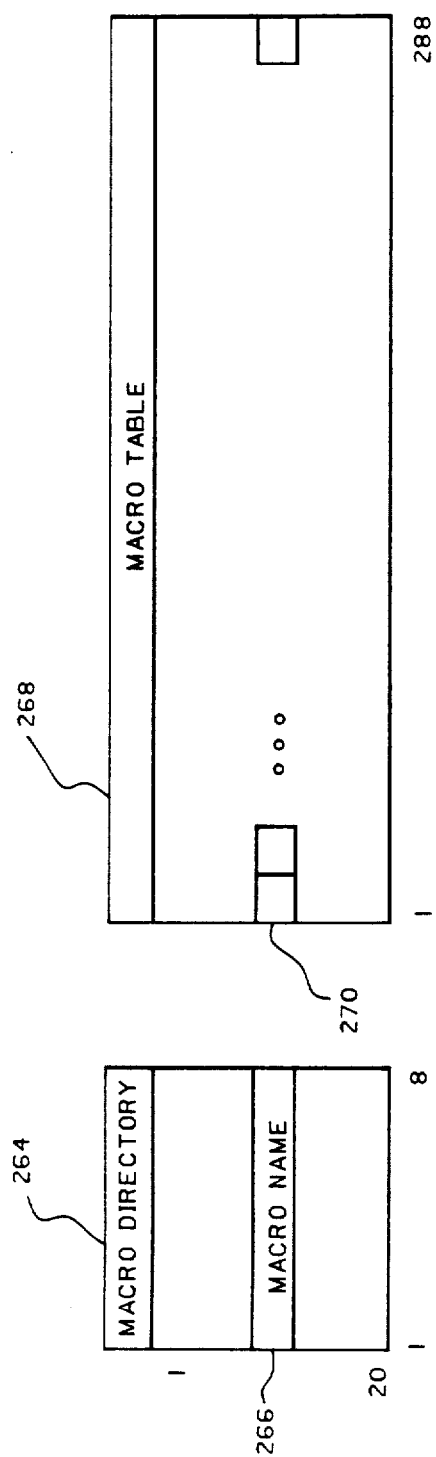
FIG. 16 illustrates a macro library.

The macro routine (MSMCRO) 32 of FIG. 1 is called by the main program 10 (FIG. 1). The macro routine uses the upper left index and lower right index from the diagram of FIG. 6 to store a macro in a macro table 268 as illustrated in FIG. 16. Each macro is given a macro name 226 which is stored in a macro directory 264 which can include arbitrarily up to 20 macros. The macro name 266 corresponds to entries in the macro table 268. Each entry in the macro table is an image of the portion of the screen the position indicated by the indices. That is, the image is a relative image. For example, if macro indices for FIG. 6 indicate a top left index of 5E and a bottom right index of 8F, the first item in the macro entry would be a shape number for the shape at 5E and the second item in the entry would be a shape for the item at 5F, the thirteenth item would be the shape number for an actuation block while the thirty-seventh item in the macro would be the shape number for the off return memory block of index 8E. When the created macro is to be entered on the diagram, the routine merely transfers the stored image from macro table 268 one item (shape number) at a time to the diagram starting at the index location specified. As each shape number is retrieved, it is used to execute the Add routine which creates the necessary equations and if properly defaulted, checks each shape as it is entered using the Check routine previously discussed.

Another method of accomplishing the replication of shapes is through using a Move command which provides the functions which would normally be expected in a spread sheet type program. That is, the move function allows the designer to specify a source range and a target range and move the source into the target and subsequently erase the source range, leave the source range as is, overwrite the target range or leave the target range as is. This routine performs its function by merely determining the shape number for each source token and transferring the shape to the target token. During the transfer, the equations that need to be created are created using the Add routine and if the source range is to be blanked, the related equations are removed from the equation list. The routine which accomplishes this function is named MSMOVE 34 in FIG. 1.

As the creation of the diagram of FIG. 6 is continued, two output shapes at 9F and 10H are created for computer outputs, that is, outputs that go to a computer monitoring the logic. These two outputs produce an equation 272 (FIG. 10) very similar to a multiple input equation. However, this multiple input equation 272 includes an output pointer 274. Also included is a token number 270, an operation code 278 of 2 and input position indication fields 280-282. The output pointer 274 points to an output identification table 284 which includes a signal ID field 290, a tag field 300 and definition field 302. This equation is created in the same manner as previously discussed equations.

Another powerful feature of the present invention is the replicate function which allows for example, the connector in 2C of FIG. 6 to be replicated down through 8C of FIG. 6. This replicate function can be performed by repetitively pressing the arrow key on the keyboard or by pressing the arrow key and indicating the number of repetitions. This function is performed by the MSADD routine. This routine operates in a manner similar to the Move routine, however, the source field is not blanked. This routine will, of course, add the proper equation and subsequently transfer the shape from the shape library to the dynamic grid.

Another form of input block is illustrated at 8J-8L of FIG. 6. This shape represents a bi-stable input and it generates an input equation 176 as in FIG. 10. This input block indicates, in the form of graphics associated with the input symbol, the way in which the input must be changed, based on analog signal conditions external to the logic circuit represented by the logic diagram of FIG. 6, in order for the bistable to assume a logic value of "True".

Eventually, after entering additional shapes including the OR gate of 10A, a time delay shape is entered. This shape creates a new equation in the equation list with basically the same record format but with different meaning for the various fields. A time delay equation 304 (FIG. 10) includes the normal output 306, token number 308 and operation code 310 fields, along with a field 312 which indicates the amount of time delay and a field 314 which indicates a bias. The operation code field 310 indicates a deactuation or an actuation after the requisite delay. The arrow associated with the symbol (See 8D and 8E in FIG. 5) indicates whether the delay is on actuation 8D or deactuation 8E. The bias field 314 (FIG. 10) indicates whether the time 312 is in seconds or milliseconds. During the creation of the equation for this shape and the shape itself on the dynamic grid, the operator is prompted for the time, bias and type of operation (actuation or deactuation).

A new type of shape is introduced at 16G (FIG. 6) and is a voter indication shape. This shape creates the same type of equation 176 as discussed above with respect to the AND and OR gates. The difference resides in the operation code that is created.

The remaining shapes on the diagram of FIG. 6 are output blocks which are created in a manner similar to the input blocks and, as previously discussed, the output block is the same as an input block except that the output field holds a pointer 274 that points to an output identification table as illustrated in FIG. 10.

The present invention also includes additional functions which allow the user to more efficiently create the logic diagrams. One of the additional functions is a Blank function which explicitly deletes pieces from the diagram and removes the associated equations by keying on the token number and any equation linking information in the equation list records. An additional function useful when limited display size is being used is a Pan function which allows the user to move the viewing area around on the dynamic diagram grid 90. This Pan function responds to the arrow keys or to a specific diagram zone (1-12) to allow quick movement about the grid, or a specific upper-left index entry.

Figure 20:
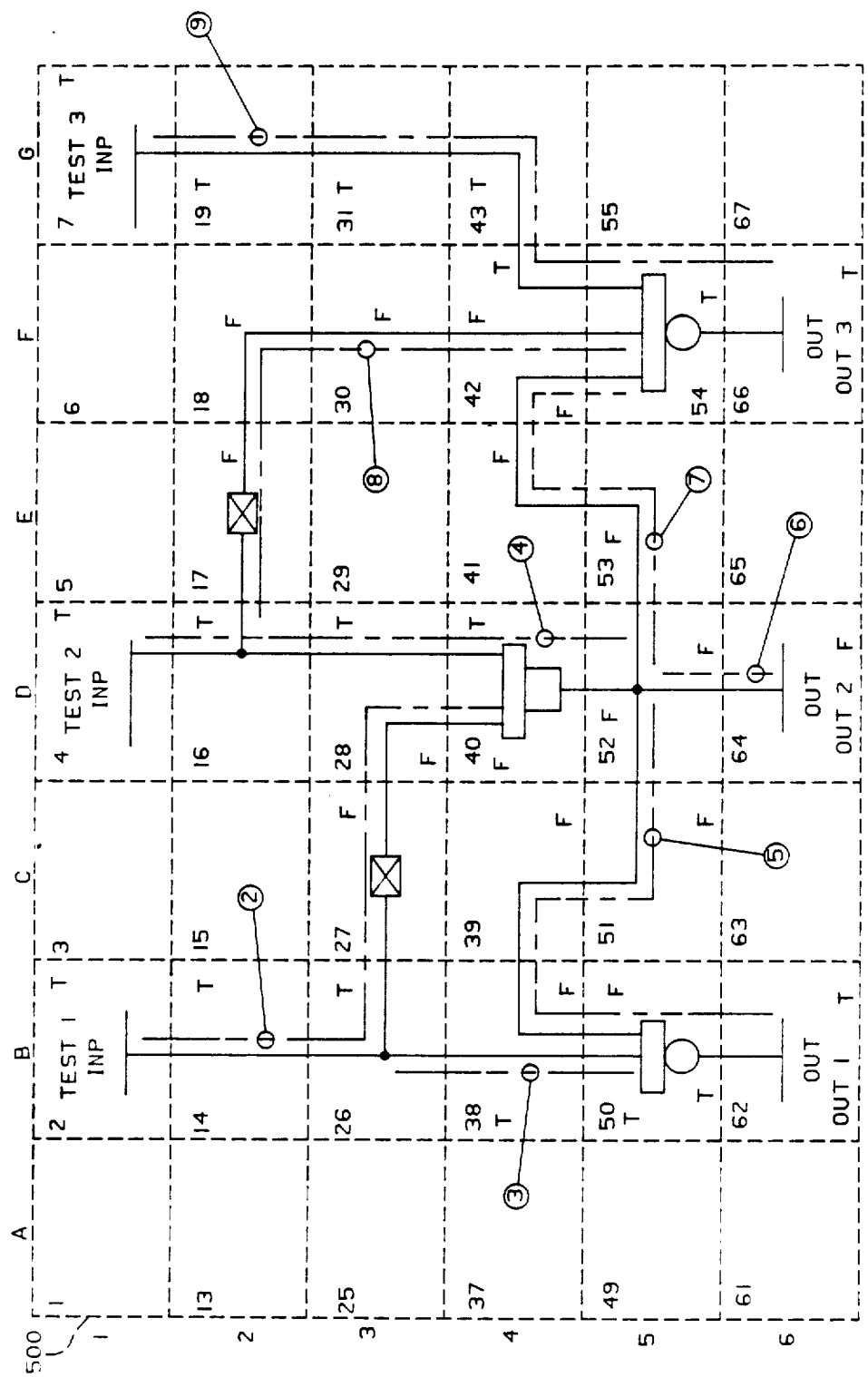
FIG. 20 is a sample logic diagram which is loaded and executed according to the present invention.

Once the entire logic diagram is entered, an intermediate diagram file is created. This file is a compressed version of the equations list, is used to load the diagram for execution and is useful in creating a paper version of the logic diagram in a computer aided drafting system. The intermediate diagram file is created by the MXSTOR routine and uses information from binary files to create an image of the diagram as a series of ASCII records. These records are broken down into header records, token records and statistics records. Each intermediate diagram file (DGX file) has 1 header record, n+1 token records and 1 statistics record, where n is the number of active tokens in the diagram, that is, blocks that contain a shape. The n+1 token record is a token record terminator with a shape number of "999" and is used to stop record processing. The exact format of the intermediate file (DGX file) is described in the compiler documentation of Appendix I, under the command description "LX" for load diagram in ASCII format. For example, the equations list for the diagram of FIG. 20, is illustrated in FIG. 17 and the corresponding intermediate diagram file (DGX file) is illustrated in FIG. 18.

The loading and execution of a logic diagram will be discussed using the intermediate file of FIG. 18 representing the logic diagram 500 of FIG. 20. However, before discussing loading and execution, the relationship between the modules (routines) of FIG. 19 will be discussed. Loading and execution are controlled by an executive routine 502 which calls the load routine 504 followed by the execute routine 506. The load routine calls the transfer routine 512 which calls the token position calculation routine 516. The execute routine 502 calls routines 518, 520 and 522 which perform functions respectively associated with (1) removing passive connectors, (2) tracing each logic action on the screen, and (3) printing a summary of the execution. The routines are provides as pseudocode modules in Appendix II.

Figure 21A:
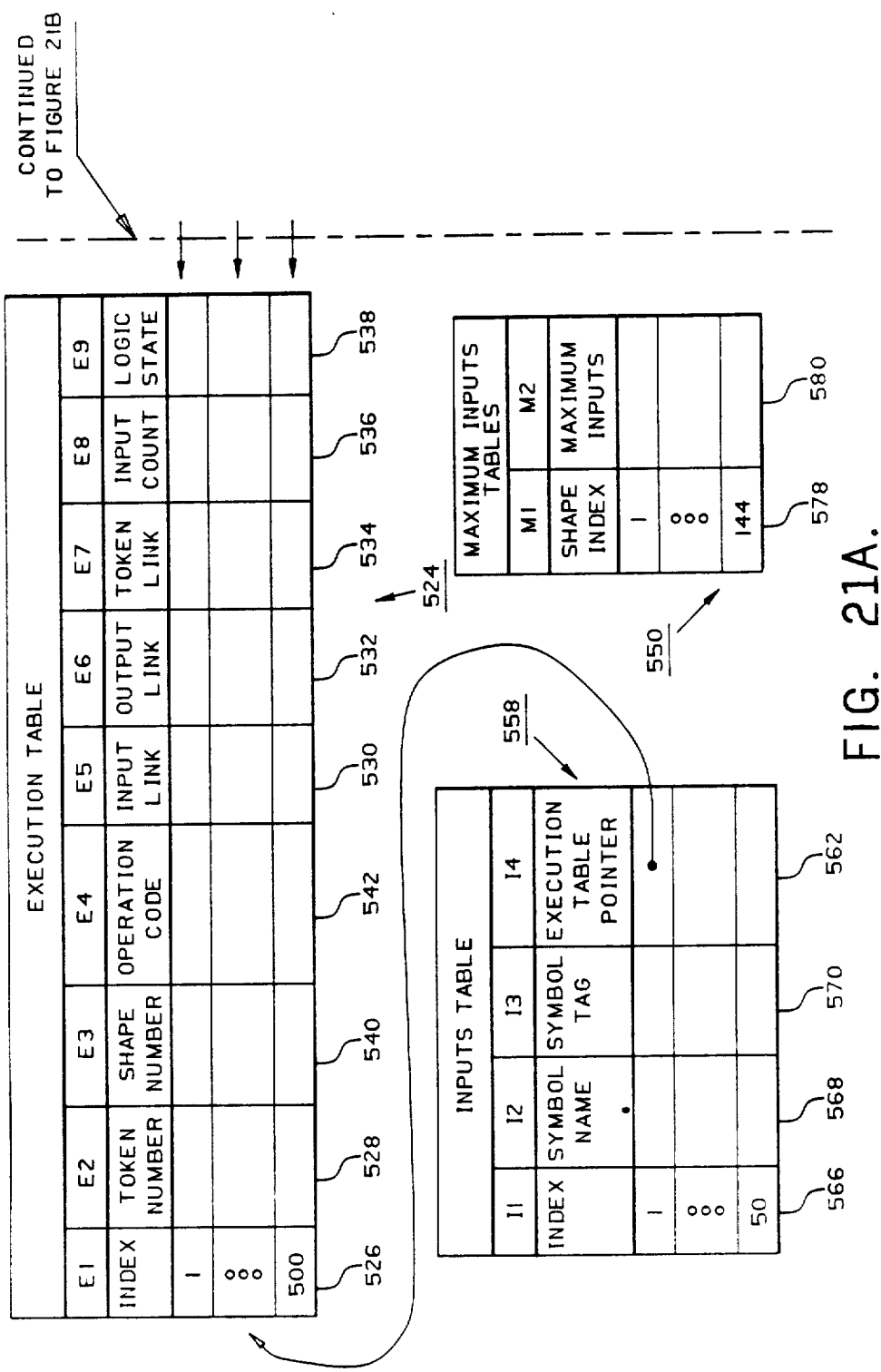
FIGS. 21A and 21B illustrate the data structure for the loading and execution of logic diagrams.
Figure 21B:
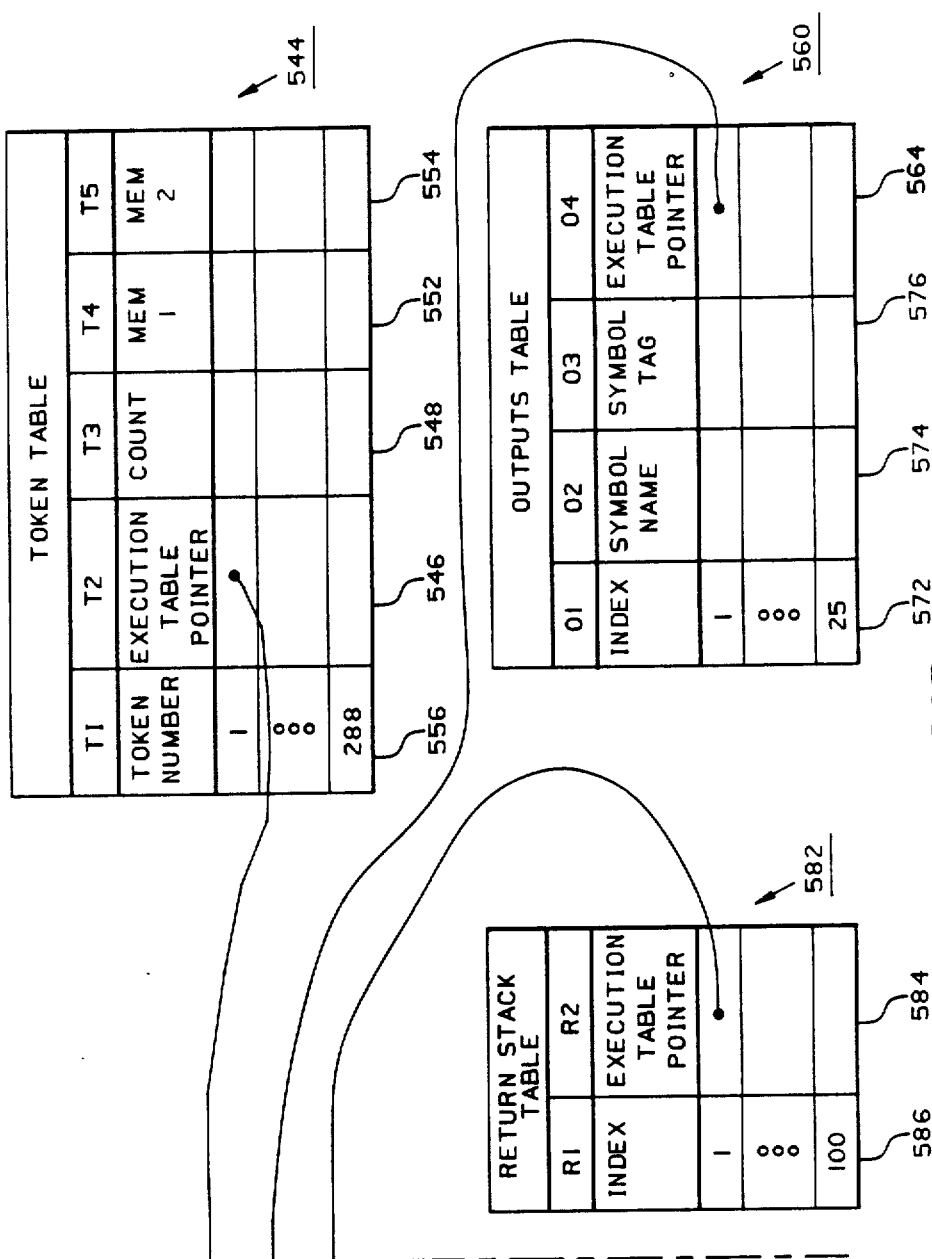

Before discussing the actual loading of the intermediate file into the static and dynamic tables used during the execution phase, we will need to discuss the format and structure of the static and dynamic execution tables. FIG. 21 illustrates the structure and relationship of these tables. The main table is called the execution table 524 and it is arbitrarily 500 records long and will contain the loaded diagram and all information needed to execute the diagram. The execution table 524 contains the linkages between the inputs and the outputs and is organized in a way that makes the loading process more complicated than the execution process. That is, the loading of the diagram in the manner described below makes the execution of the diagram faster and more straightforward. The index 526 or record number in the execution table 524 is an arbitrary index and as the diagram is loaded, the first available free record in the execution table 524 is obtained and assigned a token number in the token number field 528. The execution table is essentially a double linked list where the input link field 530 of each record contains a pointer which points to the previous record and the output link field 532 contains a pointer which points to the next record.

As previously discussed, some of the shapes result in the production of more than one equation and in such a case another link called the token link, stored in the token link field 534, is used to relate all the equations for a particular shape together so that at execution time all the branches associated with the multiple equation shape will be executed. The execution table 524 also contains fields called the input count field 536 and logic state field 538 which are used only during execution in addition to fields 540 and 542 for shape number and operation code. For example, in FIG. 20, token 26 at index B3 includes a connector branch shape which has an input from the top and outputs going to the right and down. In the intermediate file, in record 9 (FIG. 18), you will notice that there are two input/output (exit/entry code) pairs that results in two equations being created in the execution table 524. During the creation of the intermediate file, the two equations from the equations list were merged into one record. To convert the intermediate file into the execution table 524, essentially the system goes backs and unpacks the intermediate file record to create two equations and two separate entries in the execution table 524. For this particular record of the intermediate file, two equations will be created having an input link to token 14 and the first equation loaded will include a token link pointer including an index number for the next equation. The last equation in the chain of equations will have a token link of zero.

An auxiliary table called the token table 544 includes a record for each token in the dynamic grid 500 (FIG. 20). Each token table records, which are numbered from 1 to 288 corresponding to the tokens in FIG. 20, include execution table pointer fields 546 that contain a pointer that points to the first record in the execution table which represents the first equation for the particular token that contains an execution table index value. If the corresponding token table record for the token includes an entry, it will indicate that the record for the intermediate file corresponding to the token has been processed. The count field 548 in the token table 544 receives a value from the maximum inputs table 550 corresponding to the maximum number of equations associated with the shape for the particular token. For example, for the connector shape in token 26 (index B3) of FIG. 20, the count field of token number 26 (record number 26) in the token table 544 would include a 2. The two other fields 552 and 554 in the token table 544 (memory 1 and memory 2) are used solely at execution time when latch shapes are executed to memorize the latch state from one execution cycle to the next. These fields will be discussed in more detail later.

The inputs table 588 and outputs table 560 are used to store text information concerning the labels for the inputs and outputs of the logic diagram. Each of these tables includes a pointer (562 and 564) which points to the record in the execution table 524 representing the input or output. During the execution of the logic diagram (the execution table) in plant situation such as in a nuclear power plant, the inputs table 558 can be used to store the value of the input from the sensors in the plant and the output table 560 can also include a field in each record for the value of the output produced by the logic. The value fields (not shown) in the inputs table 558 can be loaded by a sensor sampling routine provided by one of ordinary skill in the art. The transmission of the logic values, in the outputs table 560 produced by the logic, to the destination devices can also be handled by a program that can be provided by one of ordinary skill in the art. As will be discussed in more detail later, the inputs table 558 is the table that drives the execution flow within the execution table 524 by percolating the inputs one at a time through the execution table 524.

As discussed earlier, the maximum inputs table 550, which is indexed (578) by shape number and not by token number, provides a number field 580 which indicates the number of inputs for a particular shape.

The remaining table is called the return stack table and has a field 584 which stores pointers to the next equation to be executed whenever a shape is being executed which includes plural equations and thus, plural branches. The return table pointer 584 allows the system to pick-up and process unprocessed branches within the logic diagram.

The loading of the various tables from the intermediate file proceeds in token order (or intermediate file record order) and throughout the discussion of the loading, snapshots of the state of the various tables will be provided to supplement the explanation of the sequence of events which occurs. The use of the logic diagram of FIG. 20 as an example allows the sequence of snapshots to show the important features of the loading process. The fields of the tables in snapshots for the purpose of brevity will be labelled only with the field labels, for example, "E2", shown in FIG. 21 instead of the full title of the field, i.e., "token number". During the loading process, as previously mentioned, the loading occurs in token order, however, the execution table 524 that results from loading is not in token order but in random linked order.

The loading process begins by examining the intermediate file (FIG. 18) and retrieving the first record which indicates that it represents token number 2. This first record in the intermediate file has its operation code examined which is a 1 indicating that this is an input shape requiring an entry in the inputs table 558. The information from the component ID and signal ID portions of the record are transferred to the inputs table 558. Next, the execution table 524 is examined to discover the first free entry and it turns out to be the first record or index, so a 1 is entered in the pointer 562 for the first record in the inputs table 558. The input pointer 530 in the execution table 524 is used to point back to the first record in the inputs table 558. That is, for input tokens, the input pointer 530 in the execution table 524 points to the corresponding record in the inputs table 558. Next, the token number, shape number and operation code are loaded from the first record in the intermediated file (FIG. 18) into the execution table 524 at respective locations without change. Since the shape number indicates an output to a token below the current token, record for the output token in the execution table 524 is preassigned. That is, the execution table 524 is examined to obtain the next free record (in this case, index or record number 2) and it is assigned a token number of 14 which token number is the token number of the token below the current token. The token number is obtained by adding 12 to the current token number. The output pointer 532 in the first record of the execution table 524 points to the execution table 524 record or index associated with the output. The token table 544 must also be updated to reflect the assignment of the records in the execution table 524 representing tokens 2 and 14. The result of loading the first record from the intermediate file of FIG. 18 into the various tables is illustrated in FIG. 22. At the end of this execution we have completed the table entries for the first intermediate file record and we have partially completed the table with respect to the 14th token. The remainder of the record 2 in the execution table 524 for the 14th token will be completed when that token is reached in the intermediate file. The routine which calculates the appropriate output token is called NXTOK 516 (FIG. 19) in the pseudocode of Appendix II.

The next record in the intermediate file (FIG. 18) is retrieved and the token table 544 is examined to see if the token number 4 for this record has been preassigned. Since this token has not been preassigned, once again, the system obtains the next available entry in the inputs table 558 (index 2) and execution table 524 (index 3) and goes through the same process as discussed with respect to the first record of the intermediate file. The third record of the intermediate file is next examined and the same set of steps occurs.

Figure 23:
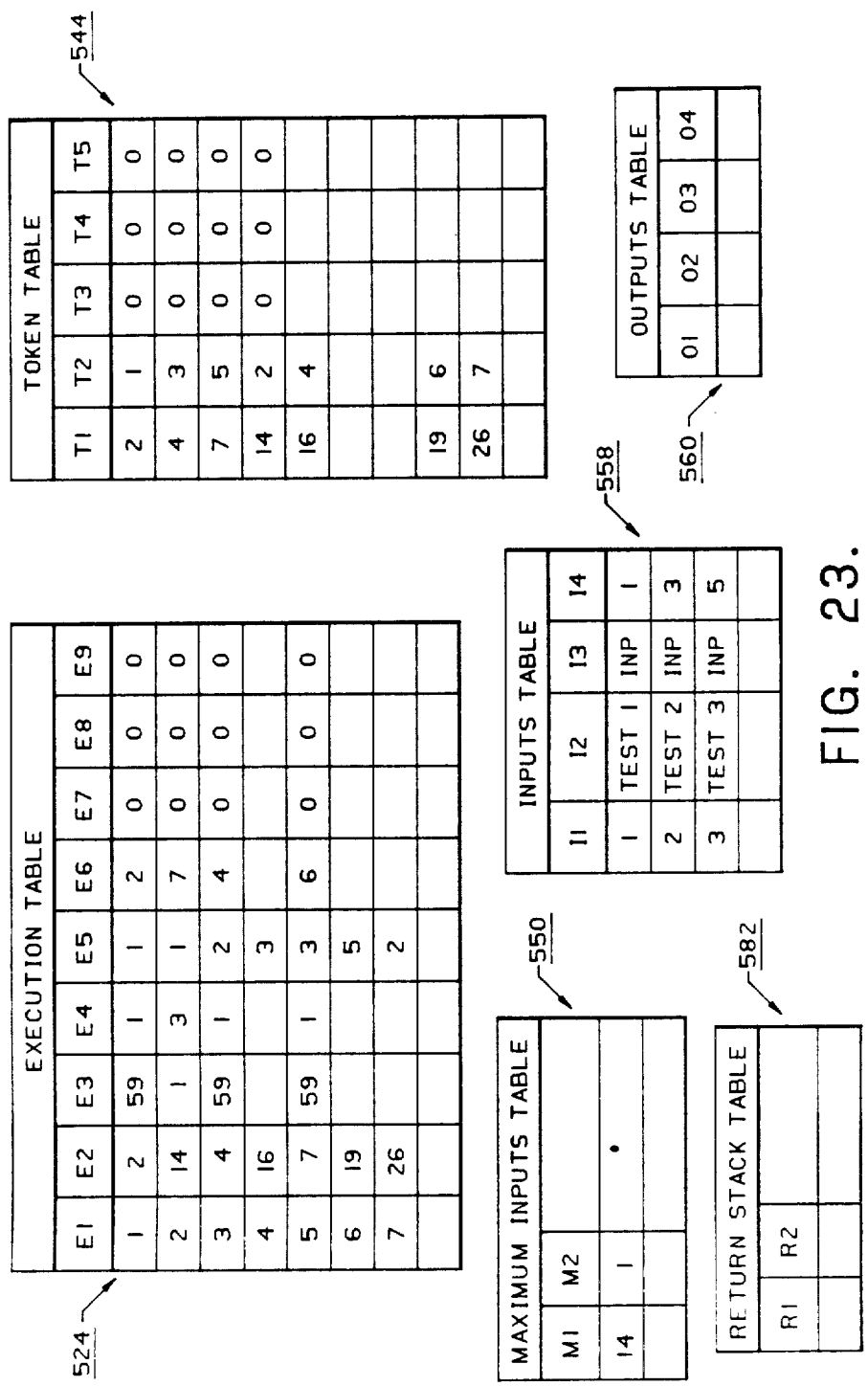

When the fourth record in the intermediate file is examined, the system notes that this token (number 14) has been preassigned a record in the execution table 524 by examining the corresponding record for the token in the token table 544. The system then moves to complete the record 2 in the execution table 524 for token number 14 by filling in the shape number, operation code and the various pointers. The system also notes that this shape is a transfer shape and that the output token for the present token must be preassigned a record in the execution table 524. Executing the NXTOK routine will result in the token number 26 being assigned to the 7th record in the execution table 524. The token table 544 is also updated to indicate that token number 26 has been preassigned. After the loading of intermediate file record number 14, the state of the tables will be as illustrated in FIG. 23. At the end of the loading of intermediate file record number 4, the execution table includes a completed record for token 14 and partial records for tokens 16, 19 and 26.

The next intermediate file (FIG. 18) record (number 5), which represents the connector block or token number 16 is loaded. (index D2 in FIG. 20). This shape is a branch shape and two equations will ultimately be present in the execution table 524. First, the system looks in the token table 544 and determines that token number 16 has been preassigned record number 4 (See FIG. 23). The shape number and operation code for record 4 is filled in, as previously discussed. Because this shape includes two input/output pairs in the intermediate file record, two output pointers will be necessary. The first will be stored in the output pointer 523 of record number 4 and the second will be stored in the second equation for this two equation shape in the execution table 524. For the first output, the system examines the token table 544 determines that token 28, the token for the first branch of this shape, has not been preassigned, examines the execution table 524 for the next available free record which is record number 8 and completes the preassignment for the output for one of the two equations by updating the input pointer 530 for record 8 and the token table 544. Since this shape produces two equations, the second of the two equations is assigned the next available free space which is record number 9 in the execution table 524. The contents of record 4 as duplicated in record 9 except for the output pointer 532. The system also determines that the output for the second of the two equations should be applied to token number 17, examines the token table 544, determines that token number 17 has not been preassigned and preassigns the next available record (record 10) to token 17 and then updates the corresponding location in the token table 544. At the end of loading record number 5 from the intermediate file, the tables will have contents as illustrated in FIG. 24, whereby two equations with two input and output pointers have been created.

Next, intermediate records 5-10 for tokens 16, 17, 18, 19, 26 and 28 are loaded. Of these records, the records for tokens 17, 18, 19 and 27 are created in the same manner as previously discussed for single equation records and the record for token 26 is loaded in the same manner as just previously discussed for token number 16. During this loading sequence, tokens numbers 18, 30, 31, 27 and 28 are preassigned.

The next record to be loaded from the intermediate file (FIG. 18) is record number 11 which corresponds to token number 28 (3D in FIG. 20) and includes an entry shape for a logic gate. This shape includes two equations which are handled in substantially the same way for loading purposes as the two equation shape previously discussed, but handled differently during execution. The determination concerning the number of equations to be created is made by looking at the exit/entry code pairs in the record, two pairs in this situation. It just so happens that both inputs for token 28 are already assigned and if they had not been assigned, the inputs would have been preassigned in the same manner as the outputs had been preassigned. That is, the system would calculate the token number for the inputs, examine the token table 544 to see if the tokens had been preassigned and assign an appropriate record number in the execution table 524 if the inputs had not been preassigned.

Figure 25:
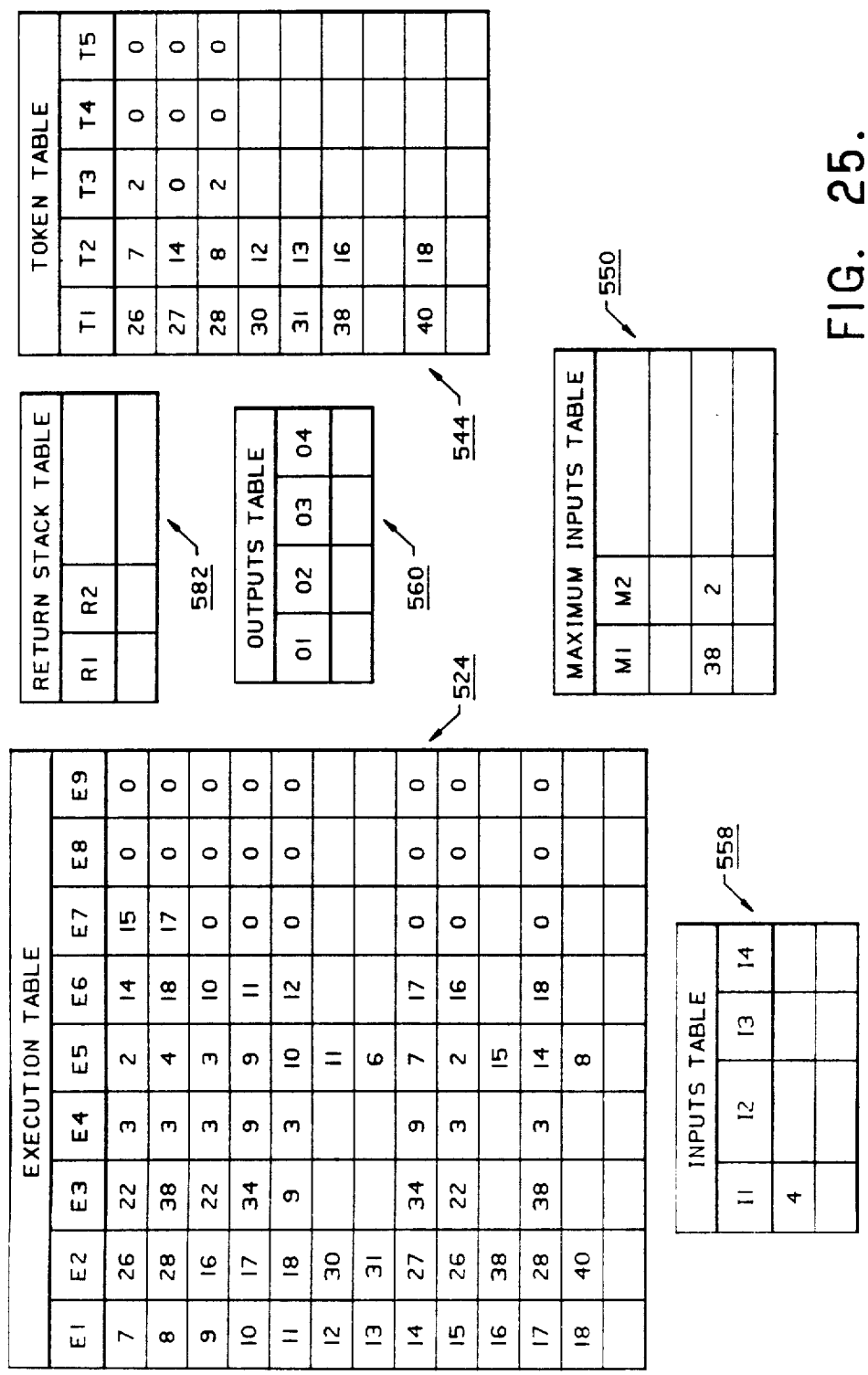

For record 11, the system examines the token table 544 and determines that token 28 has already been assigned record number 8 in the execution table 524. The fields in the execution table 524 for record number 8 can be completely filled in and a new record for the second equation for the shape is pointed to by the token pointer 534 in execution table record 8. This new equation is assigned execution table 524 record number 17. Since the shape and operation code for record 17 are the same as for record 8, these are filled in. However, since this equation represents the other input and output of the block, the input pointer 530 must point to the appropriate record (14) for the input token (token 27). Since this equation also produces an output, the execution table record for the output must be preassigned and is assigned to record number 18. During this process, the appropriate portions of the token table 544 are updated, including the count field 548 updated from the maximum inputs table 578 for shape number 38. As can be seen, the input pointer 530 in each equation (equation table records 8 and 17) always points to the first record in the equation because the remaining equations can always be found using the token pointer 534. The tables, after record number 11 from the intermediate file is loaded, will be illustrated in FIG. 25.

The next two tokens 30 and 31, loaded from records 12 and 13 in the intermediate file (FIG. 18) are connection shapes and the loading is performed in the same manner as previously discussed.

The next record, number 14, from the intermediate file, represents another gate entry shape, however, for this shape the input from token number 39 must be preassigned. This is the first shape encountered requiring input preassignment. In loading this record, first the token table 544 is examined and it is determined that the record for token 38 has been preassigned record number 16 in the execution table 524. Execution table record 16 is filled in with the shape number operation code from intermediate file record 14. The system recognizes that this is a two equation shape by examining the exit/entry code pairs and creates a second record at the next available free space (record 21) and the appropriate entry in the token table 544 is also made. For the first execution table record (record 16) and the second record (record 21) the output pointers point to the same output block which is calculated to be token number 50 and is also preassigned. The input pointer for the second equation must also be completed. The system calculates the token number for the input token and determines that token 39 has not been preassigned by examining the corresponding field pointer 546 at token 39 in the token table 544 and discovering no pointer. The input pointer for token 39 is assigned the next available free space in the execution table 524 which is record 23 in the execution table. The pointer 546 in the token table 544 is also updated with a value of 23. The result of loading shapes for tokens 30, 31 and 38, will appear as illustrated in FIG. 26.

Next, the system examines record 15 in the intermediate file (FIG. 18) for token number 39 and determines that it has been preassigned and completes this record except for the input pointer. The input pointer must be preassigned for this token as record number 24 in the execution table 524 with an output pointer pointing back to record number 23. For this record, once again, the system preassigns an input pointer rather than an output pointer.

Figure 27:
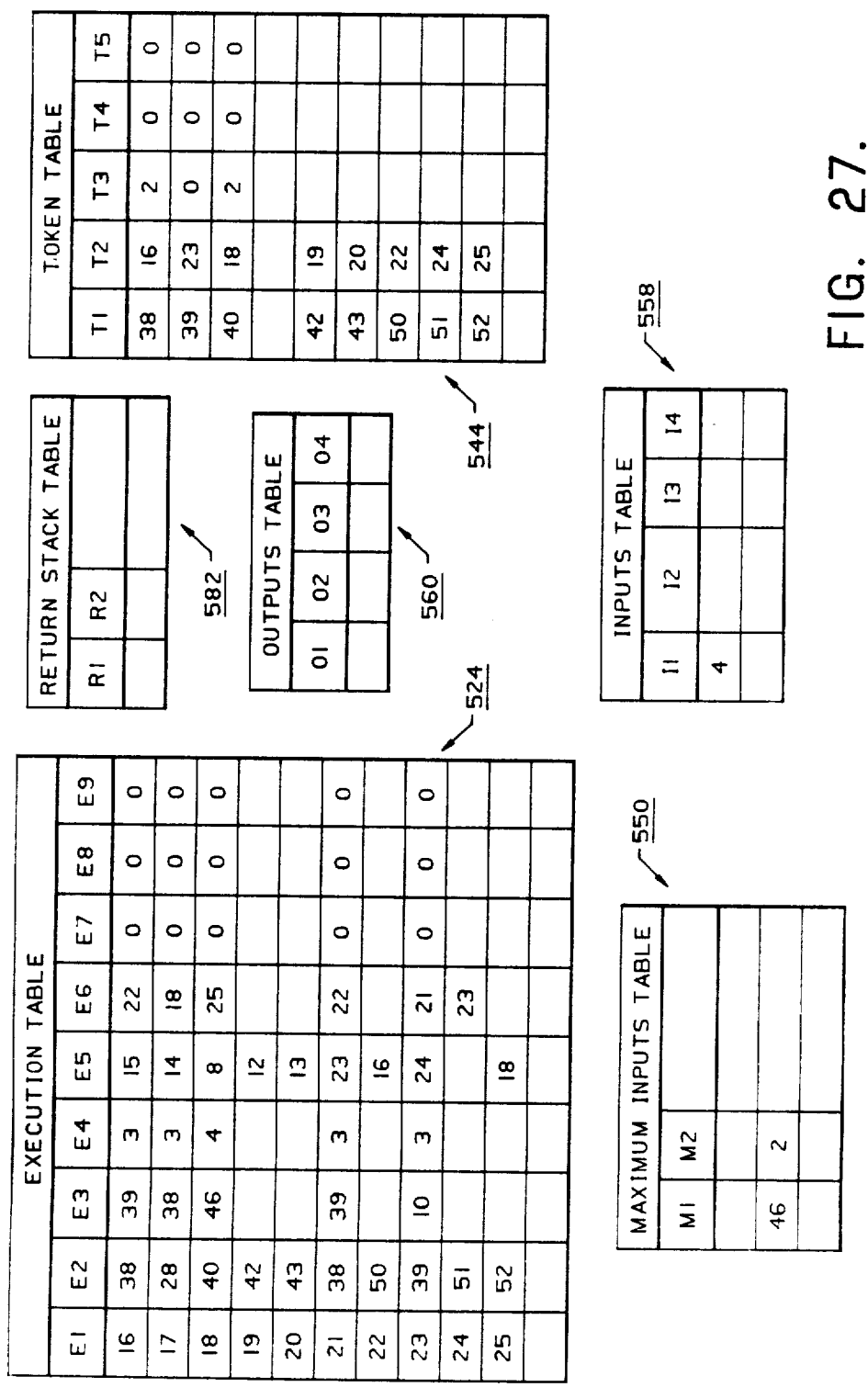

The intermediate file is then accessed to retrieve record number 16 for the AND gate of token 40 (FIG. 20). Since this token has been preassigned to execution table record 18, record 18 is completely filled in with the shape number and operation code and the output pointer for output token 52 is preassigned execution table record number 25 with an input pointer pointing back to record 18, the record for token number 40. The result with respect to the tables is illustrated by FIG. 27.

When record number 17 of the intermediate file is loaded, the system recognizes that the equations for this token have not been loaded into the execution table by examining the token table 544 and discovering no execution table pointer 546 value. The system also recognizes, by calculating the value of the appropriate input and output tokens and examining the token table 544, that both the input and output records for this token have not been preassigned. The system then preassigns execution table records 27 and 28 for tokens 42 and 53 with the appropriate input and output pointers as illustrated in FIG. 28.

The execution table records for token 42 (intermediate file record 18), which is a gate input shape similar to token 28, are created in a manner similar to the previous records. However, this shape will result in three completed records (19, 27 and 30) linked through the token pointer and each having the appropriate input and output pointers as illustrated in FIG. 29.

The equations for intermediate records 19 through 21 corresponding to tokens 43, 50 and 51 are created as previously discussed for connector and gate shape records.

The next token of interest is loaded when record number 22 of the intermediate file (FIG. 18) is loaded. This record corresponds to a branch shape which includes three output branches and a single input and will result in three equations in the execution table. First, the token table 544 is examined to determine if token 52 has been preassigned and it is determined that record 25 has been assigned for token 52. The first record (record 25) of the three equation has already had its output pointer assigned to record 24 and so, two additional equations must be created and linked through the token pointer 534. The first equation is assigned to the first available free space (record 32) in the execution table 524 and the output for that equation into token 64 is preassigned as record number 33. The appropriate portions of record 25 are copied into record 32 and the token pointer for record 32 points to the next available free space (record 34) where the third equation of this shape will be located. Once again, the appropriate portions of record 32 are copied into record 34 and the input and output pointers are stored in the record. As a result, the tables will appear as illustrated in FIG. 30.

The next two shapes (connector and gate) corresponding to intermediate file records 23 and 24 and tokens 53 and 54 are loaded in the same manner as previously discussed.

When the output shape records for tokens 62, 64 and 66 in the intermediate file (FIG. 18) are encountered, the previously preassigned records for the shapes are completed. The appropriate entries in the output table 560 are created in the same manner as for input table 558 records. However, the pointer to the corresponding output table record resides in the output pointer 532 of the execution table 524. At the end of loading all the records from the intermediate file (FIG. 18) the contents of the static and dynamic tables will be as illustrated in FIG. 31.

In general, the execution sequence starts with the input table 558 by selecting one of the inputs and carrying the input value through the records by following the output pointer in the records of the execution table 524 for subsequent shapes until a block or an impasse is encountered where the system cannot execute further because of a lack of data. The execution sequence also involves keeping track of each of the branches in the execution table 524 using pointers stored in the return stack table 582. Whenever all of the pointers in the return stack table 582 are exhausted, the inputs table 558 is used to select the next input to percolate through the logic by following the appropriate pointers. An impasse can be reached, for example, when an AND gate equation is encountered and all inputs to the AND gate are not yet available. The tables, as illustrated in FIG. 31 will be used to illustrate the execution sequence in the same manner as the loading sequence by providing a series of snapshots of the relevant portions showing the states of the tables. During the following discussion, the relevant portions (snapshots) of the records in the tables will be referred to by using record number and field symbol rather than the reference numbers of the data structure diagrams as previously discussed. The use of record number with field symbol as the method of identification during the discussion, will facilitate review of the snapshots. For example, when the discussion refers to record number 8 and pointer E7 of FIG. 31, it will be referring to the token pointer field of record 8 which in this case, has a value of 17.

Figure 32A:
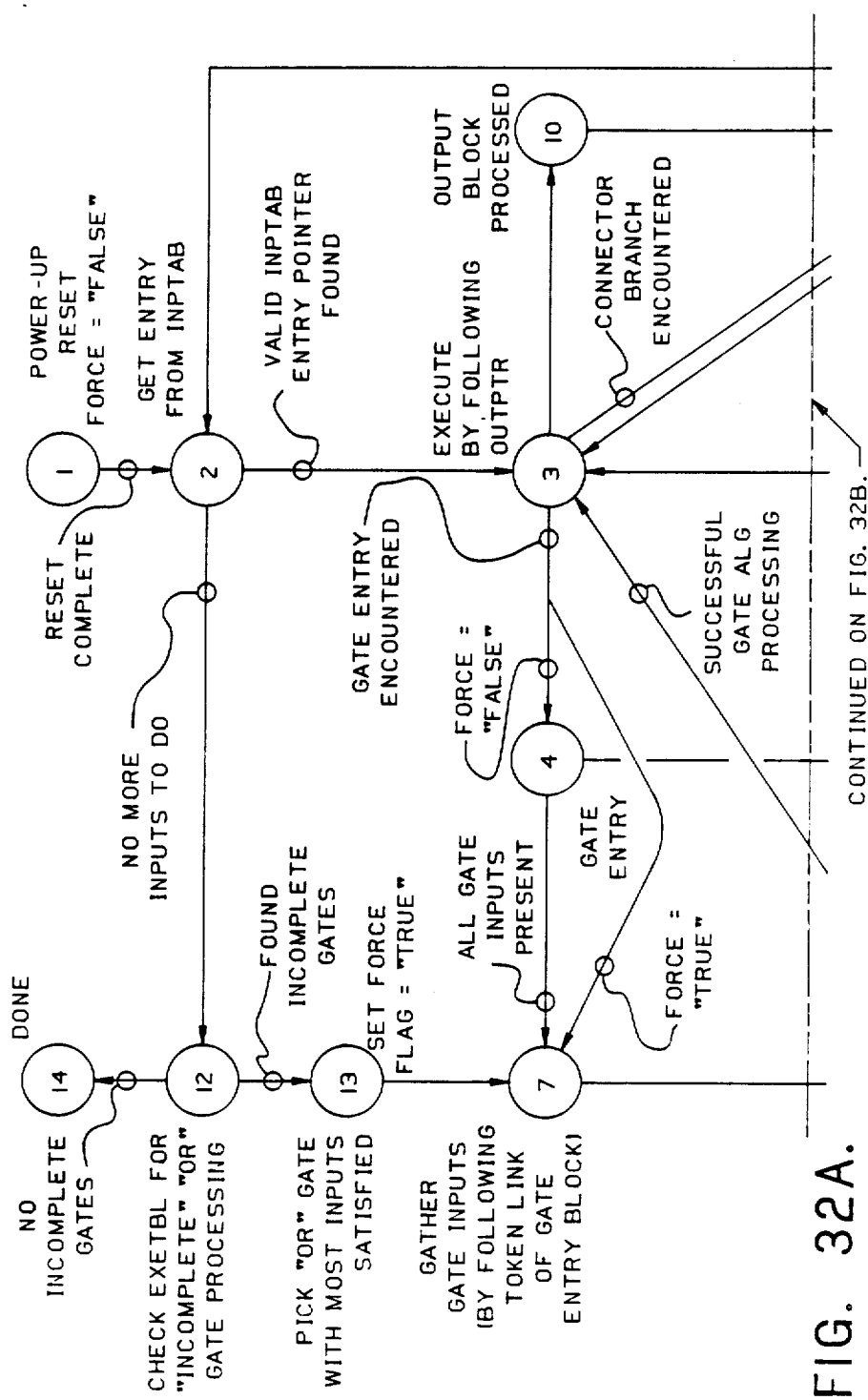
FIGS. 32A and 32B form a state diagram for the execution sequence.
Figure 32B:
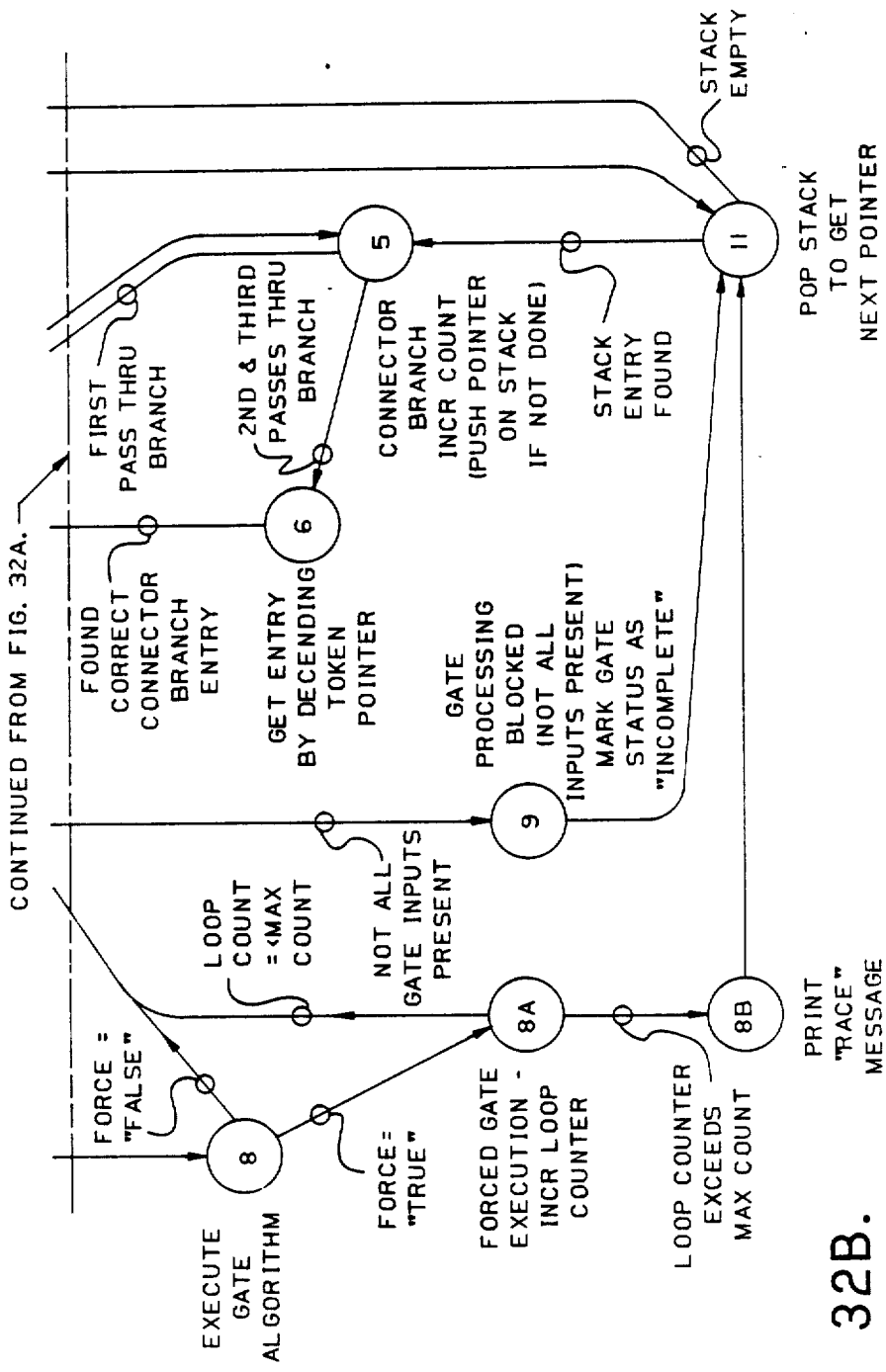

FIG. 32 illustrates the state diagram for the execution sequence and provides information related to the event which occurs in each state and the events which cause movement to a different state. The particular execution sequence for the logic diagram of FIG. 20 is illustrated in FIG. 20 by the dot dash lines and the execution state numbers in the associated circles. Pseudocode suitable for creating source code in any language to execute a logic diagram represented by the tables previously discussed is provided in Appendix II.

Figure 31B:
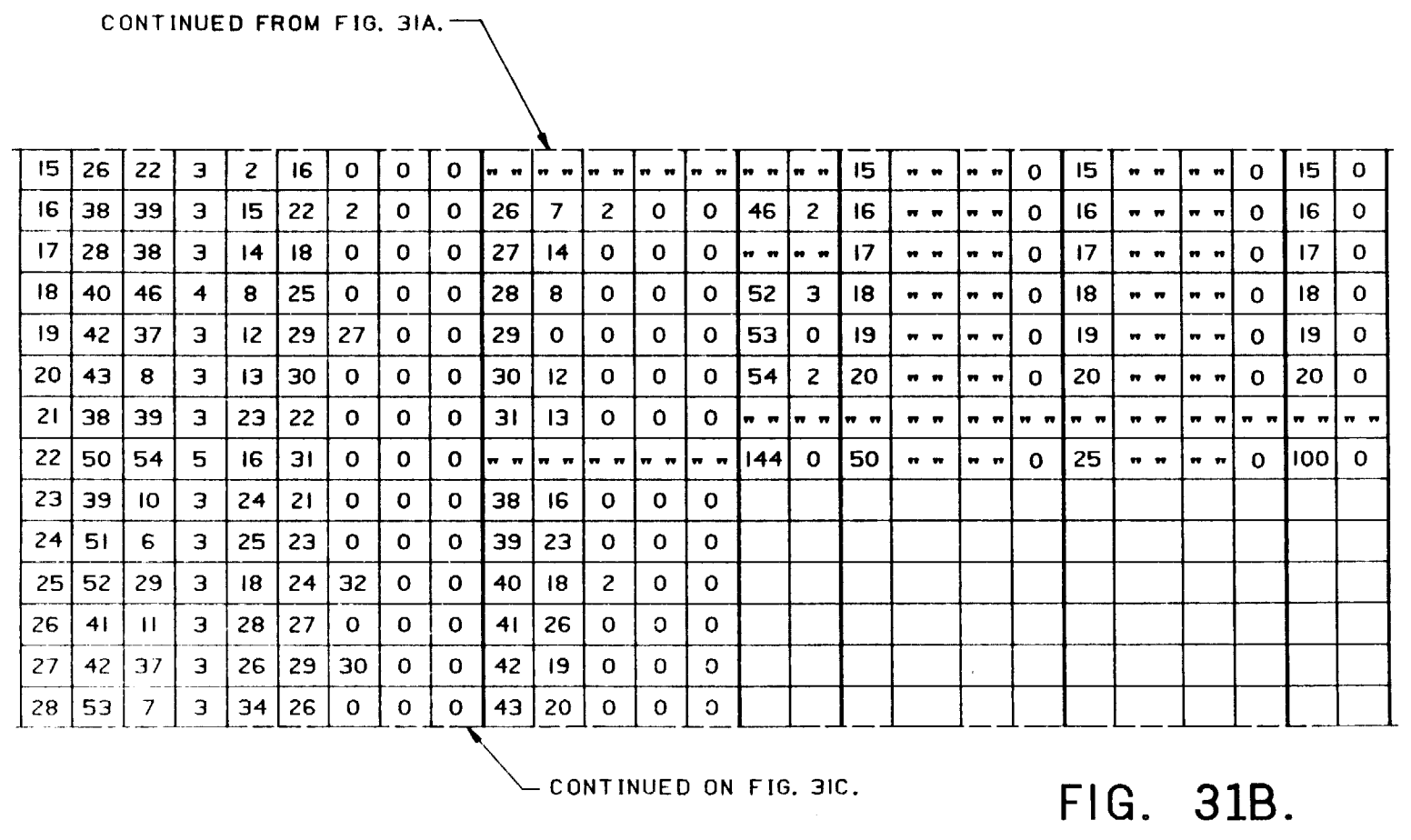

At the beginning of execution, the tables have a state, as illustrated in FIG. 31. The first execution path, which is not depicted in FIG. 20, is to obtain values for the inputs by, for example, sampling sensors or if in a test mode, providing arbitrary input values for the inputs. At the end of the first execution state, the input count E8 for execution table records 1, 3, and 5 includes a 1 and the logic state E9 for these records is indicated as true (T). The input count state of "1" indicates that valid input data has been acquired for the input but has not yet been processed by an execution sequence. When processing in an execution sequence occurs, the input count is changed to "2".

The first execution path that appears in FIG. 20 is execution path 2 and it percolates the input from token number 2 through to token number 40. FIG. 33 illustrates the steps in the second execution path as well as the results of that execution. First, the system will examine the inputs table 558 (FIG. 31) and obtains the pointer to the first equation for the first input. The first equation (record 1) in the execution table 524 has the input count E8 incremented and then is examined with respect to the whether the logic state for the input is indicated in the logic state field E9. If not, an error has occurred because the input has not been loaded. If the input has been loaded into the input equation record, the output pointer E6 is examined and followed to record number 2 which represents token 14 and the logic state E9 of record 2 is assigned a true value since the operation code of record number 2 merely says to pass the input to the output.

Next, the output pointer E6 of record 2 is followed to record 7 where an equation with a token pointer E7 value is encountered. A non-zero token pointer E7 indicates that a plural equation shape has been encountered. Whenever a record with a token output pointer value other than zero is encountered, the record number for this record (the token pointer value), in this case 15, is pushed onto the return stack R2. Execution continues by updating the logic state E9 of record 7 with true since the operation code for a branch operation code merely passes the input to the output. Since record 7 is the first equation in a multiple equation shape, the input count E8 in record 7 is compared with the count field T3 for token number 26 in the token table 54 to determine whether all the equations for this shape have been processed. The input count E8 is then incremented and the output pointer E6 is followed to record 14 which represents the NOT gate in token 27 of FIG. 20. The operation associated with a NOT gate causes the input to be inverted and stored as false in the logic state field E9 of record 14. The output pointer E6 is then followed to record 17 and the appropriate updates of the input count E8 and the logic state E9 are performed. The output pointer E6 is again followed to record 18 which represents the AND gate in token 14 of FIG. 20. The system recognizes from the shape number that this is an AND gate and it updates the input count E8 in record 18 and compares it to the count field T3 for token number 40 in the token table 544. The input count E8 indicates that one of the inputs for the AND gate is available, and the count field T3 in the token table 544 indicates that two inputs are necessary to process the AND gate. Therefore, we have reached the first impasse or block to continued execution. Whenever a block is reached, as a precautionary measure, the logic state E9 in record 18 is set at incomplete (IC).

When the system reaches an impasse, it first tries to continue by popping a record number off of the return stack table 582 and, if the return stack table 582 is empty, the inputs table 558 is accessed for the next input.

Figure 34:
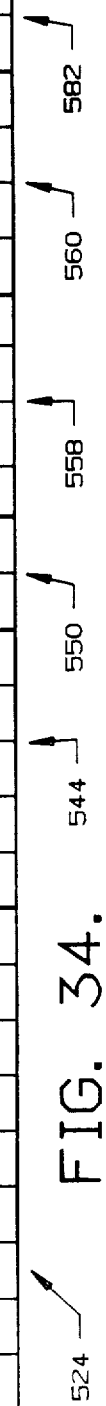

In the present situation, the return stack 582 includes a value indicating that record 15 in the execution table 524 should be returned to for continued processing. FIG. 34 illustrates execution path number 3 of FIG. 20. The shape number for record 15 indicates that this is a branch shape. For branch shapes and other multiple input shapes, the token number (number 26) in the execution table record (record 15) is used to access the token table 544 to determine the first execution table record for this shape, which turns out to be record 7. The count field T3 for token 26 in the token table 544 is compared to the input count E8 in record 7 of the execution table 524 after the input count E8 is incremented and found to be coincident. Coincidence between the input count E8 and the count field T3 for the corresponding token number indicates that processing of all the equations associated with this shape/token will have been completed when this execution path, as illustrated by path number 3 on FIG. 20.

The shape number E3 for record 15, the record presently being executed, indicates a connector, therefore, the output (logic state E9) of record 2 is simply passed therethrough, resulting in the logic state E9 of record 15 being updated to true. The token pointer E7 of record 15 is 0 so no value is pushed on the stack R2. Since the input count E8 of record 15 is zero, the output pointer E6 is followed to record 16 which is also a connector shape resulting in the logic state E9 of this record being updated to true. The output pointer E6 of record 16 is followed to record 22 which is the first encounter with the OR gate of token 50 in FIG. 15. The input count E8 of record 22 is incremented and compared to the count field T3 of token 50 in the token table and, since the two are not coincident, the system recognizes that all the input values for this shape/token are not yet available and the processing concerning this shape cannot yet be performed. That is, another execution block or impasse has been reached.

Execution will be continued with path 4 of FIG. 20, as illustrated in FIG. 35. To continue, first, the system examines the return stack R2 of FIG. 33 and finds out that it is empty and then the system returns to the input table 558 and, after examining the first record in the execution table 524 corresponding to input 1, in which the input count E8 indicates that this input has been processed, the system retrieves the input pointer I4 from record 2 of the inputs table which starts execution with record number 3 in the execution table 524.

When record 13 is examined, the system determines that a logic value for this record exists and updates the input count E8 to indicate that this input has been processed and moves to record 4 as indicated by the output pointer E6. Record 4 corresponds to a branch instruction whose input count E8 after incrementing, is not coincident with the count field T3 of the associated token (token 16) indicating that additional equations must be processed, as a result token pointer E7 having a value of 9 is pushed onto the return stack R2. Since this is a connector, the logic state E9 of the input is propagated to the output and the next record is examined by following the output pointer E6. Record number 8 is also a connector and, once again, the input is propagated to the output and the output pointer is followed to record 18. Record 18 corresponds to the AND gate in FIG. 20. The input count E8 of this record in the execution table 524 is incremented and the count field T3 of the token table 544 is compared and found to be coincident indicating that all the inputs for this shape are available. When all inputs are available processing of the multiple input shape can be performed.

To execute the AND function, the system must find the values for all of the inputs. The input pointer E5 of record 18 in the execution table 524 is examined to determine where one of the records containing an input value is located and the system then examines record 8 and determines that the token number for the inputs is 28. The token table 544 is then accessed to obtain the pointer to the first equation in the series of equations in the execution table 524 for token number 28. Token number 28 in the execution table 524 points back to record 8 in the execution table 524. Thus, the system returns to record 8, obtains the logic state value from that record and follows the token pointer E7 to record 17 and retrieves another logic state value for the AND function. By examining the token pointer E7 in record 17, which is a zero, the system recognizes that end of the linked equations in the execution table 524 for the inputs to the AND gate has been reached. The system then performs an AND function on the inputs (true and false) and propagates a false to the output of execution table record 18. The details concerning how the various gates are processed using the inputs after they are found will be discussed in detail later. The system then follows the output pointer E6 of record 18 to record 25 in the execution table 524 which, when the shape number is examined, is a multiple branch shape, requiring that the input count E8 be updated and compared to the count field T3 in the token table 544 for token 52. Since the count field T3 and the input count E8 are not coincident, the token pointer E7 having a value of 32 is pushed onto the stack, the input is propagated to the output and execution continues by following the output pointer at the end of this execution.

FIG. 36, which corresponds to execution path 5 in FIG. 20, is actually the continuation of execution path number 4, however, to illustrate and facilitate understanding of the return stack table 582 operation, the execution state starting with the second input has been broken into two paths.

Continuing with the execution as illustrated in FIG. 36, after the input is propagated to the output, the output pointer E6 of record 25 is followed to record number 24. Record number 24 corresponds to token 51 which includes a connector shape therefore, the input is propagated to the output and the output pointer E6 is followed through records 23 and 21, and eventually record 22 is reached during the fifth step in this path. Record number 22 represents the OR gate in token 50 and before the operation for the OR gate can proceed, the system determines that the inputs are all available by comparing the input count E8 of record 22 with the count field T3 of token number 50 in the token table and determines that coincidence exists. Once again, the input pointer E5 of record 22 is followed back to record 16 which is identified as representing token number 38. Token number 38 in the token table 544 is examined and the execution table pointer T2 is found to point to record number 16 in the execution table 524. Record 16 is accessed to obtain the value in the logic state of that record and the token pointer E7 of this record in the execution table 524 is followed to record 21 to obtain the next input for the OR gate which provides a false value. The token pointer E7 of record 21 is determined to be zero and thus the end of the linked equations for the inputs to the OR gate has been reached.

After all the input values have been retrieved, the OR function is performed and a true is stored in the logic state E9 of record 22 in the execution table 524. The output pointer E6 is then followed to record 31 which is an output shape and the value from record 22 of true is stored in the logic state E9 of this record.

It is possible at this point for a routine provided by one of ordinary skill in the art to actually output a value to an appropriate device connected to the system, that is, actually operate a valve or switch; however, it is the preferred practice to store the output value in a table such as the outputs table 560 so that all of the outputs can be sent to the appropriate devices at the same time.

At the end of executing the processing for the output shape of token 62, no output pointers remain to be followed. Therefore, the system examines the return stack R2, determines that record 32 should be used for execution down path 6 of FIG. 20.

The execution of path 6 will be discussed with respect to FIG. 37. Record 32 is accessed at the beginning of execution path 6 of FIG. 20 and since the shape is a branch shape, the token pointer E7 is pushed onto the return stack table R2. The output from record 18 is propagated to the logic state field E9 of record 32 since the branch shape acts as a connector. Execution continues by following the output pointer E6 to record 33 which is recognized from the shape number to be an output shape ending execution of this state when the false value is stored in the logic state field E9 of record 33 in the execution table 524.

Once again, the return stack table 582 is accessed and the top value indicating record 34 is popped off and the execution sequence for path 7 (see FIG. 20) continues with record 34 as illustrated in FIG. 38. Record 34 is the continuation of the equation for the multiple branch shape of token 52. However, since the token pointer E7 is zero for this equation, nothing is pushed onto the return stack table 38. Once the output from token 40 is propagated to the output (logic state field E9) of record 34, execution continues by following the output pointer E6 to record 28. Records 28, 26 and 27 are subsequently executed as previously discussed, so that record 29, which corresponds to the OR gate of token 54, is accessed. After the input count E8 for this record is incremented, it is compared with the count field T3 of token 54 in the token table and since they are not equal, execution of the function of the OR gate is blocked.

Figure 39:
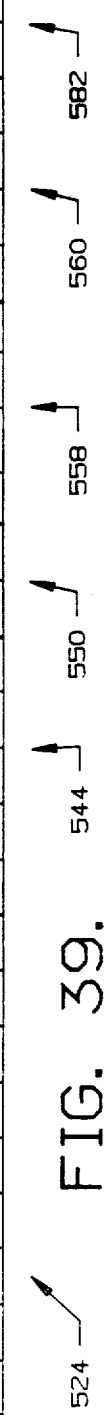

As previously discussed, when a block or impasse occurs, the system first refers to the return stack table 582 which includes a value of 9 as the top entry and thus, begins execution of the execution path 8 (See FIG. 20) with record 9 in the execution table 524, as illustrated in FIG. 39. Record 9 corresponds to token number 16 in FIG. 20 and is the right hand branch of the branch shape in that token. The processing of the branch continues in a manner similar to the processing of execution, previously discussed branch shapes, where the input is inverted from true to false and eventually the OR gate in token 54 (record 29) is reached by following the output pointers of each record accessed. When record 29 is reached, the input count E8 after incrementation is compared to the count field T3 for token 54 in the token table 524 and found to be not coincident. Thus, another block has been reached.

When the block or impasse for execution path 8 is reached, the system examines the return stack table 582 and recognizes that no pointers remain on the stack R2. The system then returns to the inputs table 558 and examines the corresponding records in the execution table 524 until an input record that includes an input count of less than 2 is found, which corresponds to record 5 in FIG. 40. Execution path 9 of FIG. 20 is started with record 5.

When record 5 of the execution table 524, for token number 7 in FIG. 20 is examined, it is found to be an input record based on the shape number and the input value stored in the logic state field is transferred through records 6, 13, 20 and 30 as previously discussed with respect to other connector shapes. When record 29 is reached, the system recognizes that this is the shape for the OR gate of token 54 and compares the input count E8 of the execution table 524, after incrementation, with the count field T3 of token 54 in the token table 524 and recognizes coincidence. Coincidence indicates that all the inputs for this shape are available. As previously discussed, the system uses the input pointer E5 to find the record containing the token number of the shape storing the inputs for the OR gate and uses the token number in the token table 544 to find the first record for that token and shape which corresponds to token 42 and record 19. The system then follows the token pointer of record 19 through the appropriate records containing the input values for the OR gate of token 54. Once the system has obtained all the inputs, the function of the OR gate is performed and the logic state of record 29 is appropriately updated with a true value.

The system then follows the output pointer of record 29 to record 35 which is the output shape for this execution sequence. When record 35 has been completely processed, the system examines the return stack table 582 and the inputs table 544 and determines that no more inputs or outputs remain to be processed.

The system then has some remaining tasks that need to be preformed to ensure that execution is finished. The present system has shapes which provide explicit latch functions and system processing, as previously discussed, will ensure that the explicit latch functions and properly executed. However, implicit latches or latches built by the designer using OR gates and AND gates can result in a logic shape such as an OR gate having an incomplete logic state because the feedback path for the latch is never executed. The problem is solved by having the system scan the logic state field E9 of the execution table 524 for incomplete logic state indicators (IC). Incomplete OR gates are processed before incomplete AND gates. If an incomplete logic state is encountered, the system assumes a logic value or "False" for OR gates and "True" for AND gates for any missing inputs and continues execution with the record having the incomplete logic state as previously discussed. The system continues examining the execution table 524 for incomplete logic states until none exist and then the system is finished and execution stops.

After execution is complete the outputs would be sent to the appropriate devices being controlled through a bit addressable output buffer by a program provided by one of ordinary skill in the art.

One of ordinary skill in the art can provide the source code for performing the function of the shapes, for example the AND function, illustrated in FIG. 5, however, Appendix II, particularly in the simplified description of execution algorithm portion sets forth preferred steps in executing the function of each of the shapes of FIG. 5. Each execution starts by collecting the inputs into an internal table 5 bytes long where a false byte is "00" hexadecimal and a true byte is "FF" hexadecimal. Processing of the inputs is performed by counting through the internal table and updating the value of the function at each until all bytes are exhausted. For example, in performing a logical AND function, the algorithm looks for the first false byte and since any false byte as an input to an AND function will result in a false output, the system stops because the output is false. In a similar manner for an OR gate, the system can stop and output the value of an OR function whenever a true value is encountered no matter how many inputs are provided. In a similar manner, the remaining functions for the shapes of FIG. 5 are set forth in Appendix II.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling with the scope of the invention. For example, it is possible to convert the equation table into an execution table without creating the intermediate file.

I claim:

1. A method of creating and executing logic diagrams to produce device outputs from device inputs, comprising the steps, executed by a computer, of:
   (a) designating a logic symbol shape and a location on a dynamic diagram for that shape;
   (b) creating a logic equation for the shape;
   (c) placing the shape in a token block on the dynamic diagram;
   (d) repeating steps (a)–(c) until the dynamic diagram is complete; and
   (e) executing a logic diagram representing the dynamic diagram comprising the steps of:
      (ei) creating execution equations from the logic equations; and
      (eii) retrieving the device inputs and executing the execution equations with the device inputs to produce the device outputs.

2. A method as recited in claim 1, wherein step (a) comprises the steps of:
   (ai) designating a shape from a shape library; and
   (aii) converting the location on the dynamic diagram into a token block number.

3. A method as recited in claim 2, wherein step (b) comprises the step of:
   (bi) creating a dynamic equation list entry from a static equation definition, where the entry includes the token block number, an operation code, an output position indicator and input position indicators.

4. A method as recited in claim 3, wherein step (c) comprises the step of:
   (ci) transferring a shape from the shape library to the diagram at the token block number indicated that designates the location on the dynamic diagram.

5. A method as recited in claim 1, further comprising the step of:
   (f) checking the dynamic diagram for completeness before execution of the logic diagram occurs.

6. A method as recited in claim 5, wherein step (f) comprises:
   (fi) comparing occupied input and output positions, for each token block, with respective output and input positions of neighboring token blocks which are neighbors of said each token block.

7. A method as recited in claim 1, wherein step (ei) comprises the steps of:
   (1) creating an intermediate file; and
   (2) loading the intermediate file into an execution table.

8. A method of creating and executing logic diagrams to produce device outputs from device inputs, comprising the steps, executed by a computer, of:
   (a) designating a logic symbol shape and a location on a dynamic diagram for that shape;
   (b) creating a logic equation for the shape;
   (c) placing the shape in a token block on the dynamic diagram;
   (d) repeating steps (a)–(c) until the dynamic diagram is complete; and
   (e) executing a logic diagram representing the dynamic diagram, step (e) comprising the steps of:
      (ei) creating execution equations from the logic equations, step (ei) comprising the steps of:
         (1) creating an intermediate file; and
         (2) loading the intermediate file into an execution table, step (2) comprising the steps of:
            (1a) creating at least one execution table record for each intermediate file record;
            (1b) preassigning input and output execution table records, as necessary, for the at least one execution table record and linking the preassigned records using input and output record pointers; and
            (1c) completing the input and output execution table records as a corresponding record in the intermediate file is encountered; and
      (eii) retrieving the device inputs and executing the execution equations with the device inputs to produce the device outputs.

9. A method as recited in claim 8, wherein an intermediate file record corresponds to a multiple equation shape and said method further comprises the steps of:
   (1d) creating multiple equation table records for the multiple equation shape;
   (1e) linking the multiple equation table records using token pointers; and
   (1f) preassigning input and output execution table records, as necessary, for the multiple equation table records.

10. A method as recited in claim 9, wherein step (eii) comprises the steps of:
    (1) propagating device inputs through the equation table records until a multiple input execution table shape record is encountered;
    (2) determining if all the inputs for the multiple input execution table shape record are available;
    (3) processing the multiple input execution table shape record when all inputs are available; and
    (4) continuing propagation of the device inputs.

11. A method as recited in claim 10 wherein step (eii) further comprises the steps of:
    (5) pushing a token pointer onto a return stack when a multiple equation table record is encountered;
    (6) continuing propagation of device inputs until an impasse is reached; and
    (7) continuing propagation with the equation table record corresponding to the token pointer on the return stack.

12. A method as recited in claim 10, further comprising the steps of:
    (8) examining the execution table records for incomplete logic states when all inputs and impasses have been processed;
    (9) assuming a value for an unavailable input for shapes with incomplete logic states; and
    (10) propagating the value through the execution table records.

13. A method of creating and executing logic diagrams to produce device outputs from device inputs, comprising the steps, executed by a computer, of:
    (a) designating a logic symbol shape and a location on a dynamic diagram for that shape by designating a shape from a shape library and converting the location into a token block number;
    (b) creating a logic equation for the shape by creating a dynamic equation list entry from a static equation definition, where the entry includes the token block number, an operation code, an output position indicator and input position indicators;
    (c) placing the shape in a token block on the dynamic diagram by transferring the shape from the shape library to the dynamic diagram at the token block number indicated;

(d) repeating steps (a)–(c) until the dynamic diagram is complete; and (e) executing a logic diagram by creating execution equations from the logic equations and retrieving the device inputs and executing the execution equations with the device inputs to produce the device outputs, where executing the execution equations includes:
  (1) propagating device inputs through equation table records until a multiple input execution table shape record is encountered;
  (2) determining if all the inputs for the multiple input equation table shape record are available;
  (3) processing the multiple input execution table shape record when all inputs are available;
  (4) continuing propagation of the device inputs;
  (5) pushing a token pointer onto a return stack when a multiple equation table record is encountered;
  (6) continuing propagation of device inputs until an impasse is reached;
  (7) continuing propagation with the equation table record corresponding to the token pointer;
  (8) examining the execution table records for incomplete logic states when all inputs and impasses have been processed;
  (9) assuming a value for an unavailable input for shapes with incomplete logic states; and
  (10) propagating the value through the equation table records.

14. A method of creating logic diagrams, comprising the steps, executed by a computer, of:
  (a) designating a logic symbol shape and a location on a dynamic diagram for that shape;
  (b) creating a logic equation for the shape;
  (c) placing the shape in a token block on the dynamic diagram; and
  (d) repeating steps (a)–(c) until the dynamic diagram is complete.

15. A method as recited in claim 14, wherein step (a) comprises the steps of:
  (ai) designating a shape from a shape library; and
  (aii) converting the location into a token block number.

16. A method as recited in claim 15, wherein step (b) comprises the step of:
  (bi) creating a dynamic equation list entry from a static equation definition, where the entry includes a token block number, an operation code, an output position indicator and input position indicators.

17. A method as recited in claim 16, wherein step (c) comprises the step of:
  (ci) transferring a shape from the shape library to the dynamic diagram at the token block number indicated.

18. A method as recited in claim 14, further comprising the step of:
  (d) checking the dynamic diagram for completeness.

19. A method as recited in claim 18, wherein step (d) comprises:
  (di) comparing occupied input and output positions, for each token block, with respective output and input positions of neighboring token blocks which are neighbors of said each token block.

20. A method of creating and executing logic diagrams to produce device outputs from device inputs, comprising the steps, executed by a computer, of:
  (a) designating a logic symbol shape and a location on a dynamic diagram for that shape by designating a shape from a shape library and converting the location into a token block number;
  (b) creating a logic equation for the shape by creating a dynamic equation list entry from a static equation definition, where the entry includes the token block number, an operation code, an output position indicator and input position indicators;
  (c) placing the shape in a token block on the dynamic diagram and transferring a shape from the shape library to the dynamic diagram at the token block number indicated;
  (d) repeating steps (a)–(c) until the dynamic diagram is complete,
  (e) creating execution equations from the logic equations; and
  (f) retrieving the device inputs and executing the execution equations with the device inputs to produce the device outputs.

21. A method as recited in claim 20, wherein step (e) comprises the steps of:
  (1) creating an intermediate file; and
  (2) loading the intermediate file into an execution table.

22. A method of executing logic equations, comprising steps, executed by a computer, of:
  (a) creating execution equations from the logic equations, step (a) comprising the steps of:
    (1) creating an intermediate file; and
    (2) loading the intermediate file into an execution table, step (2) comprising the steps of:
      (2a) creating at least one execution table record for each intermediate file record;
      (2b) preassigning input and output execution table records, as necessary, for the at least one execution table record and linking the preassigned records using input and output record pointers; and
      (2c) completing the input and output execution table records as a corresponding record in the intermediate file is encountered; and
  (b) retrieving the device inputs and executing the execution equations with device inputs to produce device outputs.

23. A method as recited in claim 22, wherein an intermediate file record corresponds to a multiple equation shape and said method further comprises the steps of:
  (2d) creating multiple equation table records for the multiple equation shape;
  (2e) linking the multiple equation table records using token pointers; and
  (2f) preassigning input and output execution table records, as necessary, for the multiple equation table records.

24. A method as recited in claim 23, wherein step (f) comprises the steps of:
  (1) propagating device inputs through the equation table records until a multiple input execution table shape record is encountered;
  (2) determining if all the inputs for the multiple input equation table shape record are available;
  (3) processing the multiple input execution table shape record when all inputs are available; and
  (4) continuing propagation of the device inputs.

25. A method as recited in claim 24, wherein step (f) further comprises the steps of:
- (5) pushing the token pointer onto a return stack when a multiple equation table record is encountered;
- (6) continuing propagation of device inputs until an impasse is reached; and
- (7) continuing propagation with the equation table record corresponding to the token pointer.

26. A method as recited in claim 24, further comprising the steps of:
- (8) examining the execution table records for incomplete logic states when all inputs and impasses have been processed;
- (9) assuming a value for an unavailable input for shapes with incomplete logic states; and
- (10) propagating the value through the equation table records.

27. A method executing logic equations, comprising the steps, executed by a computer, of:
- (a) creating execution equations from logic equations; and
- (b) retrieving device inputs and executing the execution equations with the device inputs to produce device outputs and including the steps of:
  - (1) propagating the device inputs through equation table records until a multiple input execution table shape record is encountered;
  - (2) determining if all the inputs for the multiple input equation table shape record are available;
  - (3) processing the multiple input execution table shape record when all inputs are available;
  - (4) continuing propagation of the device inputs;
  - (5) pushing a token pointer onto a return stack when a multiple equation table record is encountered;
  - (6) continuing propagation of device inputs until an impasses is reached;
  - (7) continuing propagation with the equation table record corresponding to the token pointer;
  - (8) examining the execution table records for incomplete logic states when all inputs and impasses have been processed;
  - (9) assuming a value for an unavailable input for shapes with incomplete logic states; and
  - (10) propagating the value through the equation table records.

* * * * *